(12) United States Patent
Yamamura

(10) Patent No.: US 11,194,079 B2
(45) Date of Patent: Dec. 7, 2021

(54) LENS UNIT, EXPOSURE DEVICE, LED HEAD, IMAGE FORMING APPARATUS, AND SCANNING DEVICE

(71) Applicant: Oki Data Corporation, Tokyo (JP)

(72) Inventor: Akihiro Yamamura, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 280 days.

(21) Appl. No.: 16/279,373

(22) Filed: Feb. 19, 2019

(65) Prior Publication Data

US 2019/0257983 A1 Aug. 22, 2019

(30) Foreign Application Priority Data

Feb. 21, 2018 (JP) .............................. JP2018-028360

(51) Int. Cl.
| G02B 3/00 | (2006.01) |
| G02B 7/02 | (2021.01) |
| G02B 5/00 | (2006.01) |
| H04N 1/028 | (2006.01) |
| G03G 15/04 | (2006.01) |

(52) U.S. Cl.
CPC ........... G02B 3/0062 (2013.01); G02B 5/003 (2013.01); G02B 7/021 (2013.01); G03G 15/04054 (2013.01); H04N 1/02865 (2013.01)

(58) Field of Classification Search
CPC ...... G02B 3/0062; G02B 5/003; G02B 5/005; G02B 7/021; G03G 15/04054; H04N 1/026865
See application file for complete search history.

(56) References Cited

U.S. PATENT DOCUMENTS

| 5,648,874 A * | 7/1997 | Sawaki | ..................... B41J 2/465 359/619 |
| 2013/0314752 A1 * | 11/2013 | Yamamura | ......... G03G 15/0409 358/302 |

FOREIGN PATENT DOCUMENTS

JP 2012-189915 A 10/2012

* cited by examiner

*Primary Examiner* — Alicia M Harrington
(74) *Attorney, Agent, or Firm* — Rabin & Berdo, P.C.

(57) ABSTRACT

A lens unit includes a first lens array including first lenses arranged in at least two lines; a second lens array including second lenses arranged in an arrangement relationship corresponding to the first lens array, the second lenses respectively facing the first lenses, the second lens array being arranged to face the first lens array so that each pair of the first and second lenses has a common optical axis; and a first light blocking member arranged between the first lens array and the second lens array and having first openings each being arranged to face the pair of the first and second lenses in a direction of the optical axis. An interval PXL from an array center position between two adjacent lines to the optical axis and an interval PXS from the array center position to an opening center of the first opening satisfy PXL<PXS.

11 Claims, 20 Drawing Sheets

LENS UNIT, EXPOSURE DEVICE, LED HEAD, IMAGE FORMING APPARATUS, AND SCANNING DEVICE

BACKGROUND OF THE INVENTION

1. Field of the Invention

The present invention relates to a lens unit, an exposure device, an LED head, an image forming apparatus, and a scanning device.

2. Description of the Related Art

Conventionally, an optical system that forms an object's upright isometric image like a line is used for image forming apparatuses of the electrophotographic type employing an LED head including a plurality of LEDs arranged in an array and for scanning devices such as scanners and facsimile machines forming an image of a document on a photoreceiving section including a plurality of photoreceptor elements arranged sequentially. As an example of the optical system, an optical system employing a lens array including an array of a plurality of microlenses is known. See Japanese Patent Application Publication No. 2012-189915 (Page 7, FIG. 4), for example.

Arranging a light blocking member having openings formed at intervals equal to arrangement intervals of the lenses makes it possible to block rays having aberration among rays forming the image and thereby obtain a clear image; however, there is a problem in that the image is necessitated to be dark.

SUMMARY OF THE INVENTION

A lens unit according to the present invention includes: a first lens array including a plurality of first lenses arranged in at least two lines in parallel with a first direction; a second lens array including a plurality of second lenses arranged in an arrangement relationship corresponding to the first lens array, the plurality of second lenses respectively facing the plurality of first lenses of the first lens array, the second lens array being arranged to face the first lens array so that each pair of the first and second lenses facing each other has a common optical axis; and a first light blocking member arranged between the first lens array and the second lens array and having a plurality of first openings each being arranged to face the pair of the first and second lenses in a direction of the optical axis. In a second direction orthogonal to the first direction and the direction of the optical axis, an interval PXL from an array center position that is a center between two adjacent lines of the at least two lines to the optical axis and an interval PXS from the array center position to an opening center of the first opening satisfy a relationship of PXL<PXS.

According to the lens unit according to the present invention, among the rays forming the image, rays having aberration can be blocked and the amount of light blockage can be held down, which makes it possible to obtain a clear and bright image.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 16A and 16B are graphs showing test results of an illuminance distribution test (2) in the first embodiment, wherein FIG. 16A is a graph showing the average of illuminance distributions measured at each position and FIG. 16B shows a PV value calculated as the difference between the maximum value and the minimum value in the illuminance distribution;

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

First Embodiment

Figure 1:
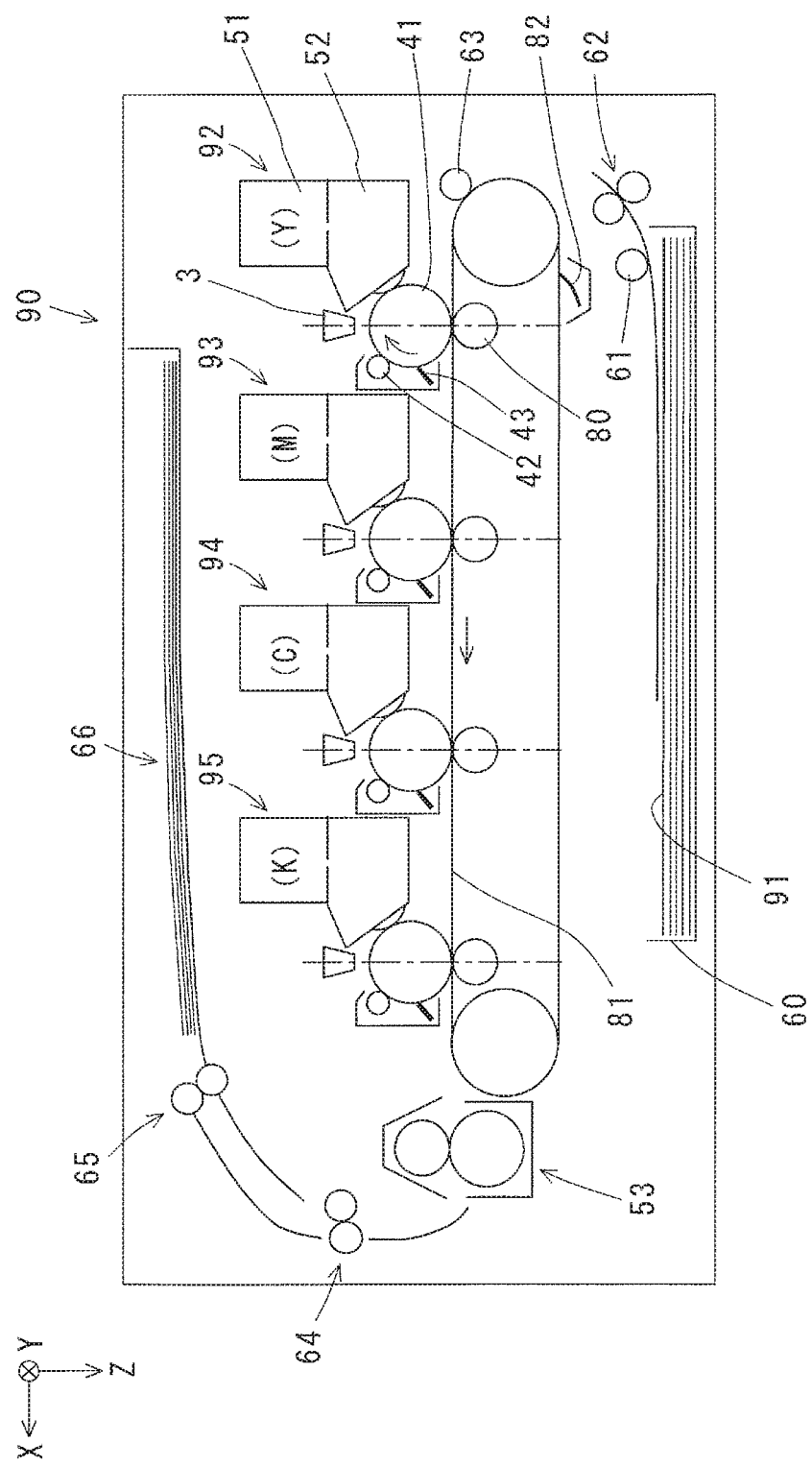
FIG. 1 is a principal part configuration diagram showing a principle part configuration of a color printer as an image forming apparatus of a first embodiment of the present invention.

FIG. 1 is a principal part configuration diagram showing a principle part configuration of a color printer as an image forming apparatus of a first embodiment of the present invention. The color printer 90 shown in the figure is a printer of the color electrophotographic type that forms an image on a print medium based on image data by using toners each made with resin containing a pigment as a color material.

In the color printer 90, a sheet feed cassette 60 storing recording sheets 91 as print media is loaded, and a sheet feed roller 61 for extracting a recording sheet 91 from the sheet feed cassette 60 and conveyance rollers 62 and 63 for conveying the recording sheet 91 to an image forming section are arranged. Further, in the color printer 90, toner image forming sections 92, 93, 94 and 95 for forming toner images of yellow (Y), magenta (M), cyan (C) and black (K) colors are successively arranged from an upstream side as image forming sections along a conveyance path of the recording sheet 91 conveyed in a direction of an arrow in FIG. 1. The toner image forming sections 92 to 95 have the same configuration except for the use of the toners of their respective colors.

As shown in the toner image forming section 92 using the toner of yellow (Y), for example, each toner image forming section includes a photosensitive drum 41 as an electrostatic latent image bearing body rotating in a direction of an arrow in FIG. 1, a charging roller 42 for supplying electric charge to a surface of the photosensitive drum 41 and thereby charging the surface, an LED head 3 as an exposure device for selectively applying light to the charged surface of the photosensitive drum 41 based on image data and thereby forming an electrostatic latent image, a development device 52 for developing the electrostatic latent image formed on the photosensitive drum 41 by using the toner and thereby forming a toner image, a toner cartridge 51 for supplying the toner to the development device 52, and a cleaning blade 43 arranged in contact with the photosensitive drum 41 to remove the toner remaining on the surface of the photosensitive drum 41.

Furthermore, in the color printer 90, a transfer belt 81 that conveys the recording sheet 91, transfer rollers 80 each placed to face a corresponding photosensitive drum 41 and sandwich the transfer belt 81 with the photosensitive drum 41 so as to transfer the toner image, as an image obtained by visualizing the electrostatic latent image by using the toner, formed on the photosensitive drum 41 onto the recording sheet 91, and a cleaning blade 82 for cleaning the transfer belt 81 by scraping off the toners adhering to the transfer belt 81 are arranged as a transfer section. Further arranged are a fixation device 53 for fixing the toner image formed on the recording sheet 91 by applying heat and pressure to the toner image, a conveyance roller 64 for conveying the recording sheet 91 after passing through the fixation device 53, and ejection rollers 65 for ejecting the recording sheet 91 to an ejection section 66 storing recording sheets 91 having images fixed thereon.

Predetermined voltages are applied to the charging rollers 42 and the transfer rollers 80 by a non-illustrated power supply. The transfer belt 81, the photosensitive drums 41, the sheet feed roller 61, the conveyance rollers 62 to 64, and the ejection rollers 65 are rotationally driven respectively by non-illustrated motors and non-illustrated gears for transmitting drive force. Further, the non-illustrated power supply and a non-illustrated control device are connected to the development devices 52, the LED heads 3, the fixation device 53 and the non-illustrated motors.

The color printer 90 further includes an external interface that communicates with an external device and receives print data and a control section that receives the print data from the external interface and controls the whole of the color printer 90; however, detailed description of these components is omitted here since these components are not directly relevant to the present invention.

As for the X, Y and Z-axes in FIG. 1, the X-axis is taken in a conveyance direction of the recording sheet 91 passing through the toner image forming sections 92 to 95, the Y-axis is taken in a rotation axis direction of the photosensitive drums 41, and the Z-axis is taken in a direction orthogonal to both of the X-axis and the Y-axis. When the X, Y and Z-axes are shown in other drawings explained later, these axes are assumed to indicate directions in common with the drawings. Namely, the X, Y and Z-axes in each drawing indicate the direction of arrangement of the part shown in the drawing at the stage when the part forms a part of the color printer 90 shown in FIG. 1. Here, the arrangement is made so that the Z-axis is substantially in a vertical direction and a +Z-axis direction is set as the downward direction in the vertical direction.

Figure 2:
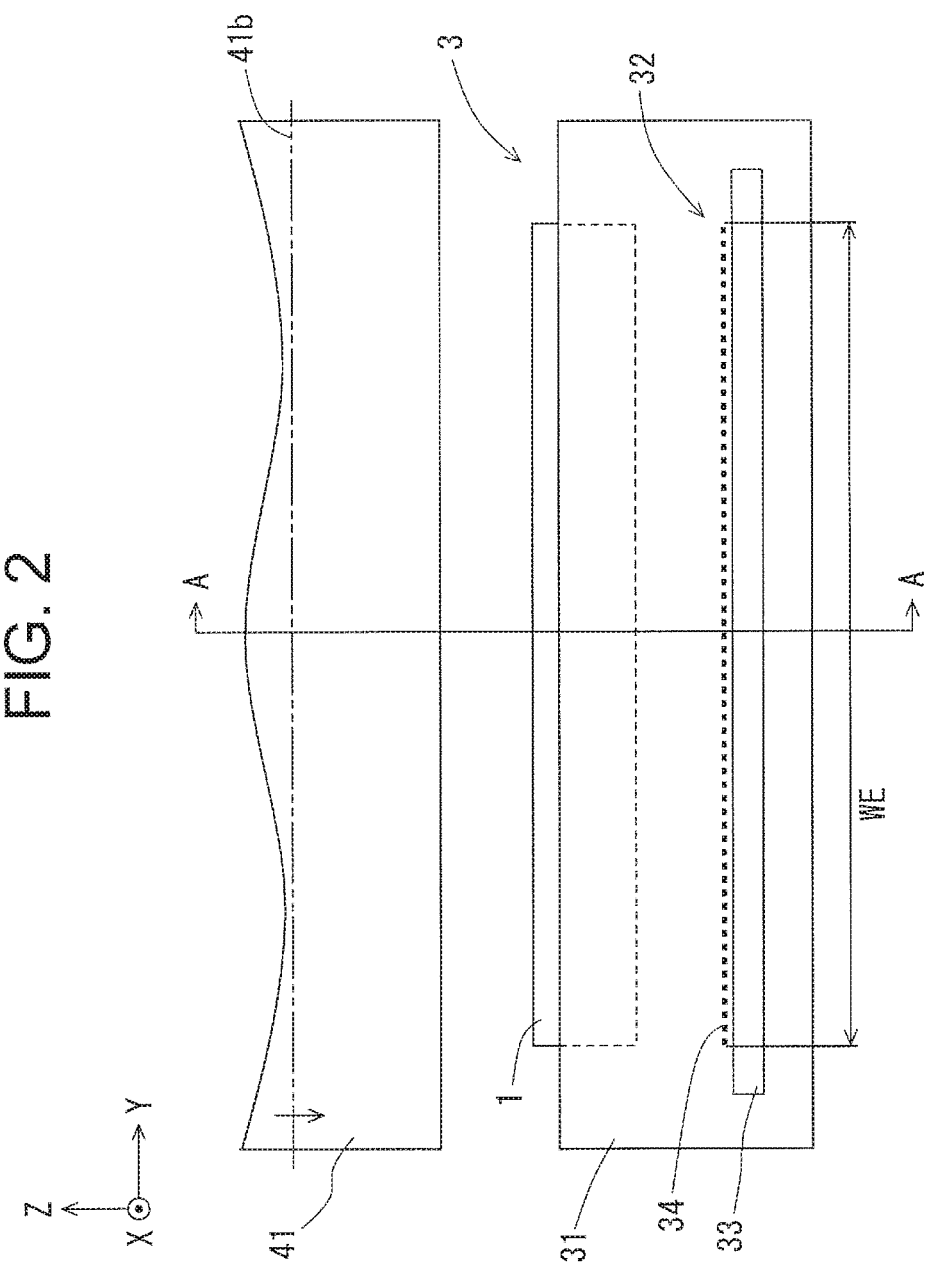
FIG. 2 is a schematic configuration diagram showing an LED head and a photosensitive drum viewed from a +X-axis side.

FIG. 2 is a schematic configuration diagram showing the LED head 3 and the photosensitive drum 41 viewed from the +X-axis side, wherein the LED head 3 and the photosensitive drum 41 are vertically inverted as compared to those in FIG. 1. In this case, the photosensitive drum 41 rotates in a direction of an arrow in the figure.

The LED head 3 includes a lens unit 1, a holder 31 and an LED array 32, in which the holder 31 holds the lens unit 1 and the LED array 32 in a predetermined positional relationship which will be explained later. LED elements 34 are arranged substantially in a straight line on a circuit board 33 to form the long-shaped LED array 32 as a light-emitting unit. The LED array 32 is held so that an arrangement direction of the LED elements 34 is the Y-axis direction (i.e., the rotation axis direction of the photosensitive drum 41), and the lens unit 1 is also held so that its lengthwise direction is parallel with the LED array 32. The length of the LED array 32 in this example is assumed to be WE.

Thus, the LED head 3 is arranged so that both of the arrangement direction of the LED elements 34 of the LED array 32 and the lengthwise direction of the lens unit 1 are parallel with a rotary shaft center 41b of the photosensitive drum 41.

Figure 3:
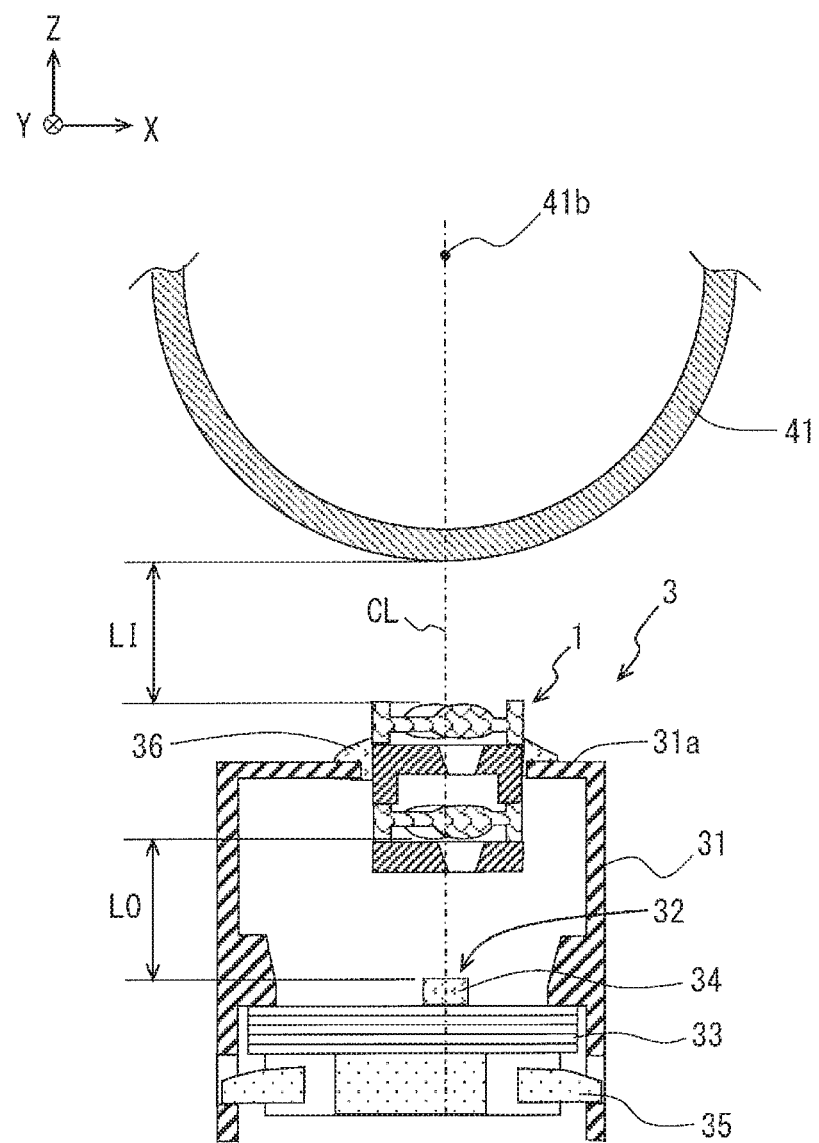
FIG. 3 is a cross-sectional view taken along a line A-A shown in FIG. 2.

FIG. 3 is a cross-sectional view taken along a line A-A shown in FIG. 2. As shown in the figure, let CL represent a center of the lens unit 1 in a width direction of the lens unit 1 (i.e., X-axis direction), a center of the LED elements 34 and the rotary shaft center 41b of the photosensitive drum 41 in this example are arranged on a straight line extrapolating the width direction center CL, and further, an optical axis 25 (see FIG. 7) of each lens of the lens unit 1 which will be explained later is arranged to be in the Z-axis direction. Thus, in this example, the width direction of the lens unit 1 is a horizontal direction.

Accordingly, the lens unit 1 is arranged on a top surface 31a of the holder 31 to fit in a holder opening formed to extend in the holder's lengthwise direction, fixed by using an adhesive agent or the like, and further provided with a seal member 36, by which a gap occurring between the holder 31 and the lens unit 1 is filled and leakage of light is prevented. The LED elements 34 are arranged on the circuit board 33, and the circuit board 33 is supported by a base 35 and thereby fixed to the holder 31.

When the LED head 3 is arranged to face the photosensitive drum 41 as above, the LED head 3 is arranged so that a distance LO from a light-emitting surface of the LED elements 34 to an opposing lens surface of the lens unit 1 and a distance LI from the surface of the photosensitive drum 41 to an opposing lens surface of the lens unit 1 are equal to each other, namely, LI=LO. Incidentally, arrangement relationships of components of the LED head 3 will be described in detail later.

Figure 4:
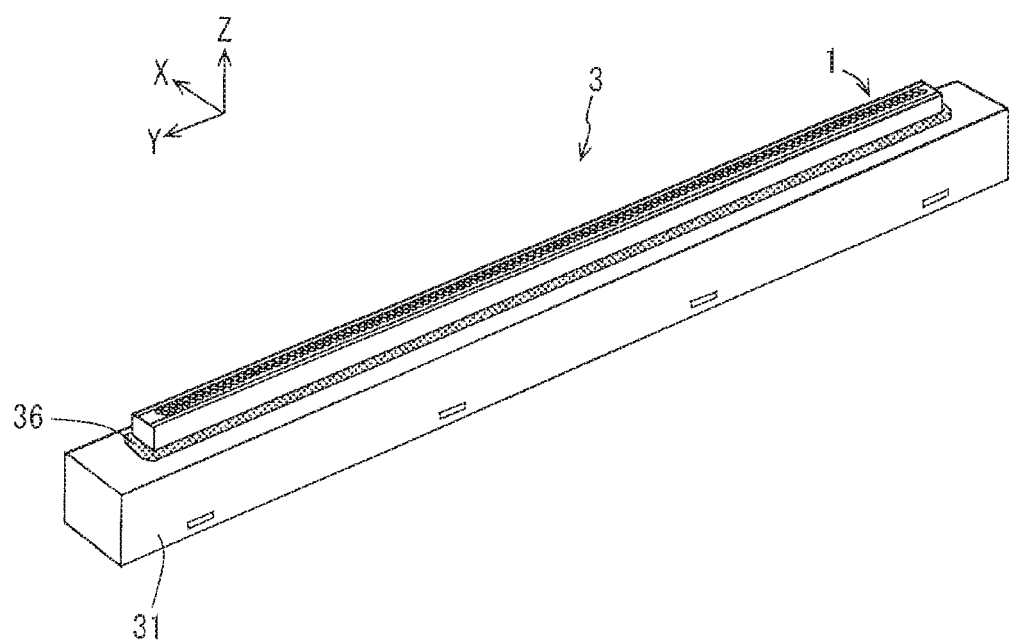
FIG. 4 is an external perspective view showing the LED head.
Figure 5:
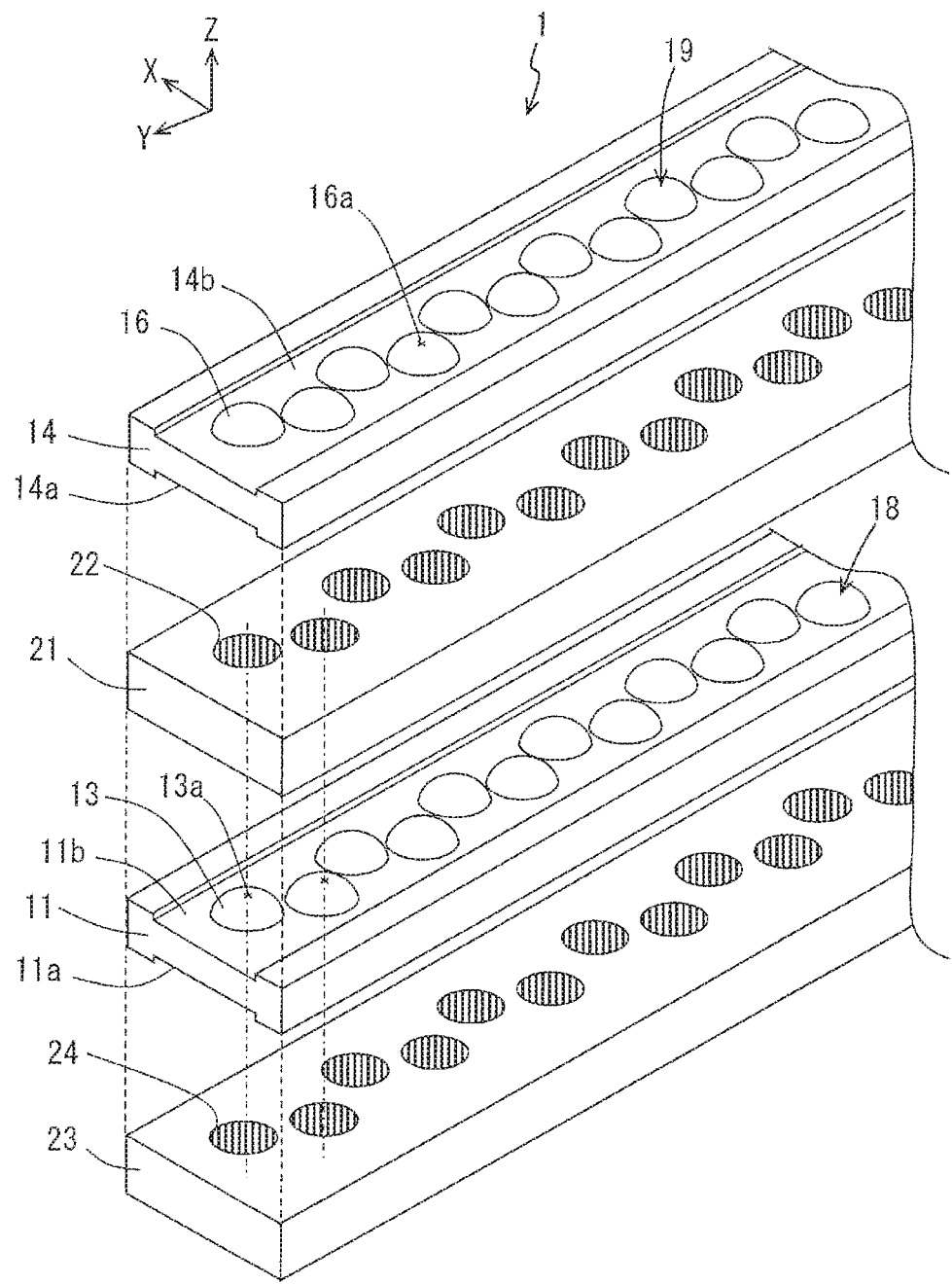
FIG. 5 is an exploded perspective view magnifying a part in the vicinity of an end of a lens unit.

FIG. 4 is an external perspective view showing the LED head 3, and FIG. 5 is an exploded perspective view magnifying a part in the vicinity of an end of the lens unit 1.

The LED head 3 is provided with the lens unit 1. The lens unit 1 is fixed by the holder 31 and thereby arranged so that the direction of the optical axis (i.e., the direction in which a light beam enters and exits) of each lens of the lens unit 1 is the Z-axis direction. The seal member 36 is provided to fill the gap occurring between the holder 31 and the lens unit 1. In the first embodiment, the LED head 3 has a resolution of 1200 dpi and the LED elements 34 (see FIG. 2) of the LED array 32 are arranged at a density of 1200 pieces per inch (1 inch equals approximately 25.4 mm). Namely, an arrangement pitch PD of the LED elements 34 is 0.021167 mm. Further, a center value of emission wavelengths of the LED elements 34 in this example is 770 nm.

Next, a configuration of the lens unit 1 in the first embodiment will be described below.

As shown in FIG. 5, the lens unit 1 includes a mask 23 as a second light blocking member, a first lens plate 11 as a second lens array, a light blocking plate 21 as a first light blocking member, and a second lens plate 14 as a first lens array, successively arranged in the Z-axis direction from a side closer to the LED elements 34 (FIG. 3) placed under (i.e., on the −Z-axis side of) the lens unit 1.

A plurality of lens surfaces 13 are arranged in two lines on a back surface 11b as a surface of the first lens plate 11 on the photosensitive drum 41's side (i.e., +Z-axis side), a plurality of lens surfaces 16 are arranged in two lines on a back surface 14b as a surface of the second lens plate 14 on the photosensitive drum 41's side (i.e., +Z-axis side), a plurality of openings 22 as first openings are arranged in two lines in the light blocking plate 21, a plurality of openings 24 as second openings are arranged in two lines in the mask 23, and surface vertices 13a of the lens surfaces 13 and the openings 22 and 24 are respectively arranged substantially at constant intervals so as to face each other in the Z-axis direction. The light blocking plate 21 and the mask 23 are formed of a material that blocks the light beams from the LED elements 34 (FIG. 3).

Incidentally, lens surfaces 12 (FIG. 7) are also formed at predetermined positions on a front surface 11a as a surface of the first lens plate 11 on the side of the LED elements 34 (FIG. 3) (i.e., −Z-axis side), and lens surfaces 15 (FIG. 8) are also formed at predetermined positions on a front surface 14a as a surface of the second lens plate 14 on the side of the LED elements 34 (FIG. 3) (i.e., −Z-axis side).

Figure 6:
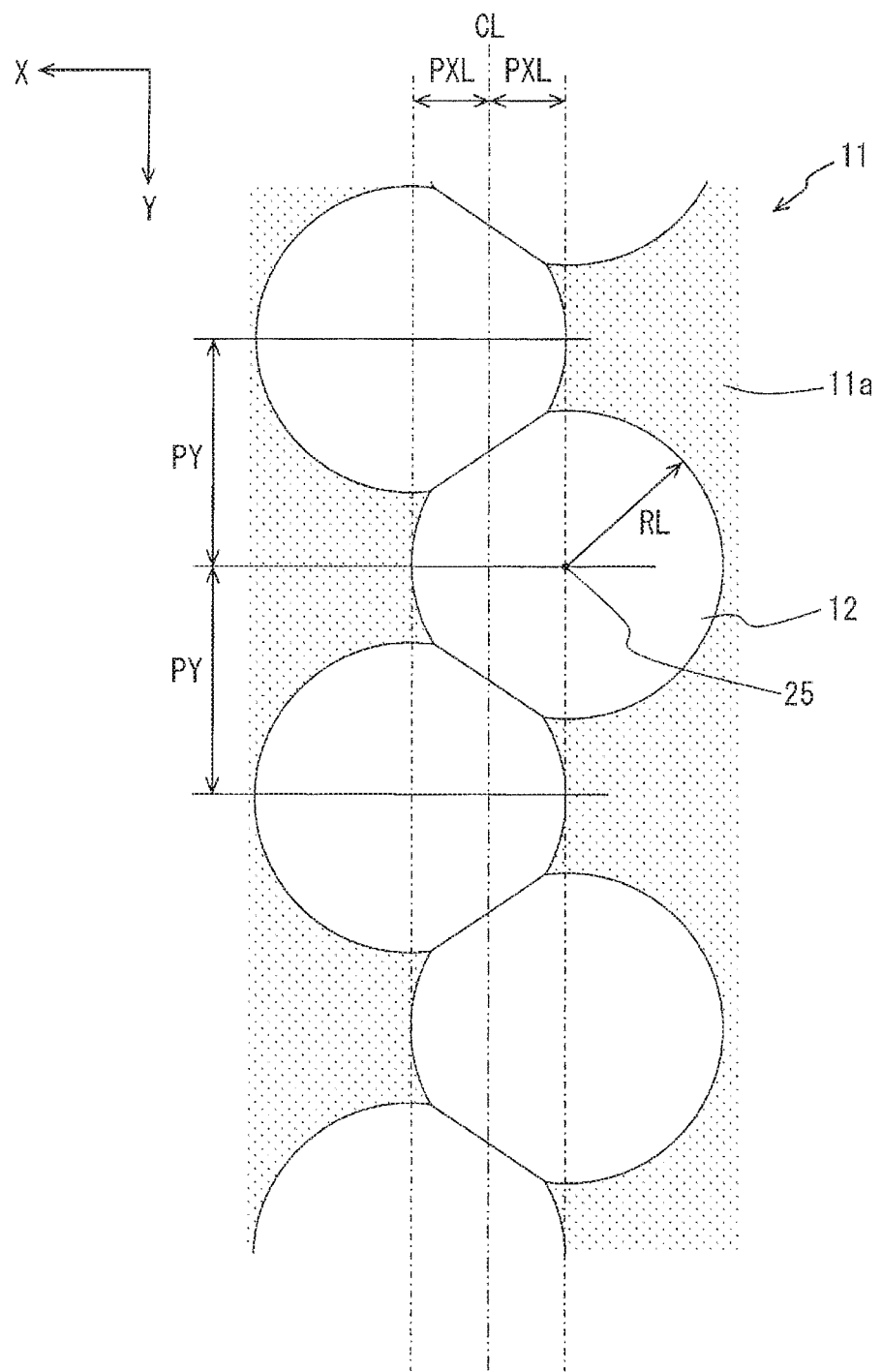
FIG. 6 is an arrangement diagram showing arrangement positions of lens surfaces formed on a front surface of a first lens plate shown in FIG. 5 seen through other components from an upper side (i.e., +Z-axis side) in FIG. 5.

FIG. 6 is an arrangement diagram showing arrangement positions of the lens surfaces 12 formed on the front surface 11a of the first lens plate 11 shown in FIG. 5 seen through other components from the upper side (i.e., +Z-axis side) in FIG. 5. The shape of the first lens plate 11 will be described further with reference to FIG. 6.

As shown in FIG. 6, on the front surface 11a of the first lens plate 11, a plurality of lens surfaces 12 are arranged in two lines in a zigzag pattern. Assuming that the arrangement interval between adjacent lens surfaces 12 in the arrangement direction (i.e., Y-axis direction) is PY, the arrangement interval of the lens surfaces 12 in each line is twice PY (i.e., 2×PY). Further, the lens surfaces 12 arranged in the two lines are formed so that their centers are distributed into width direction (i.e., X-axis direction) positions at an interval PXL from the width direction center CL. The radius of each lens surface 12 is RL, and a part of the front surface 11a where no lens surface 12 is formed is a flat surface.

The plurality of lens surfaces 13 formed on the back surface 11b of the first lens plate 11 are respectively arranged corresponding to and at the same positions as the plurality of lens surfaces 12 on the front surface 11a in regard to the arrangement direction (i.e., Y-axis direction) and the width direction of the first lens plate 11 (i.e., X-axis direction). The description will be given assuming that a pair of front and back lens surfaces 12 and 13 facing each other forms front and back surfaces of one lens 18.

Incidentally, the lens surface 12 and the lens surface 13 differ from each other in the surface shape as will be explained later.

On the other hand, in contrast with the first lens plate 11, the back surface 14b of the second lens plate 14 has the lens surfaces 16 in the same shapes and arranged at the same positions as the lens surfaces 12 on the front surface 11a of the first lens plate 11, and the front surface 14a of the second lens plate 14 has the lens surfaces 15 in the same shapes and arranged at the same positions as the lens surfaces 13 on the back surface 11b of the first lens plate 11. Thus, the second lens plate 14 and the first lens plate 11 are in the same shape and configured to be plane-symmetrical with each other in the Z-axis direction, for example, with respect to an imaginary plane orthogonal to the Z-axis and presumed between the second lens plate 14 and the first lens plate 11. The description will be given assuming that a pair of front and back lens surfaces 15 and 16 facing each other forms front and back surfaces of one lens 19.

Figure 8:
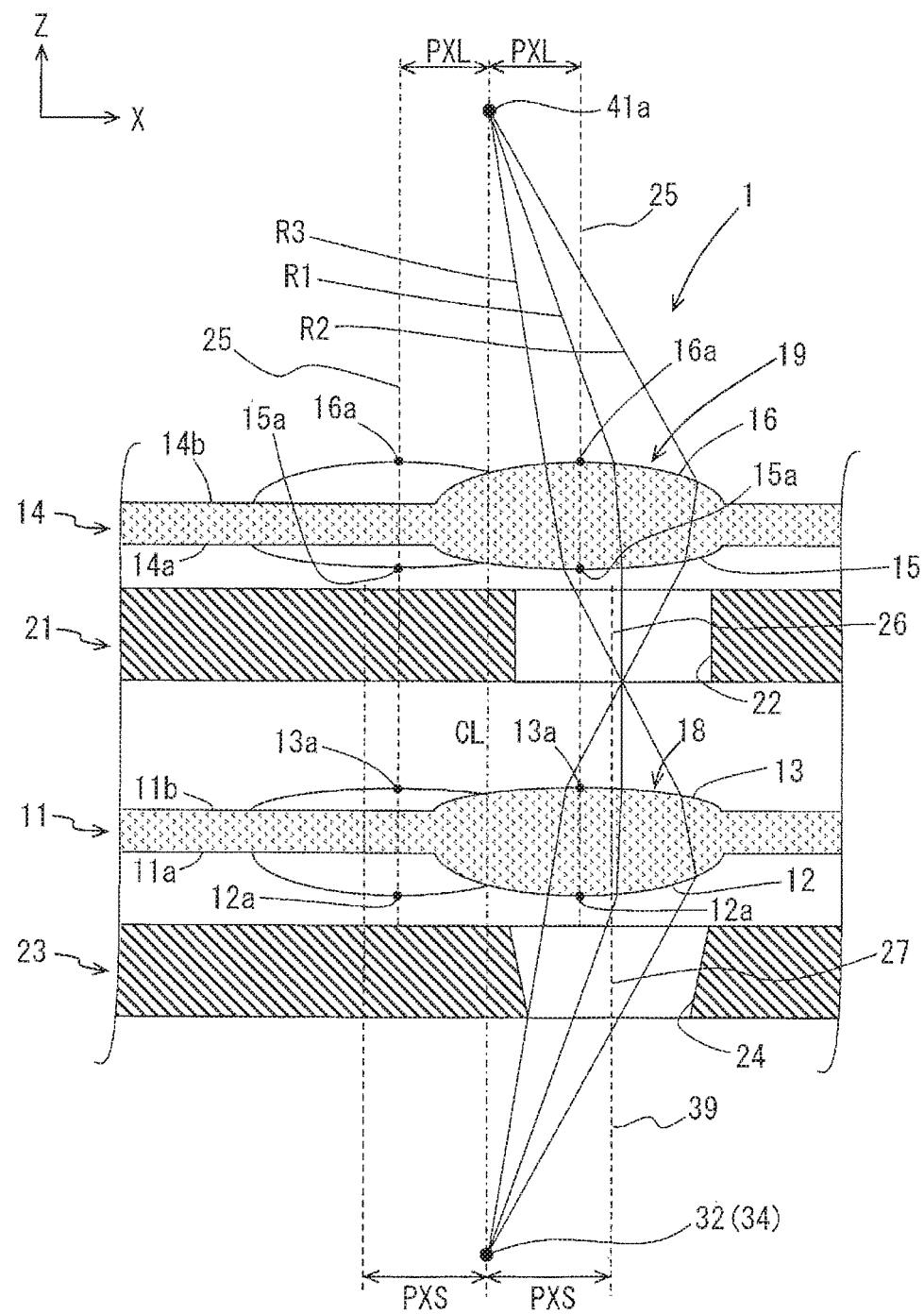
FIG. 8 is a cross-sectional view taken along a line B-B shown in FIG. 7.

Therefore, each of the lenses 18 of the first lens plate 11 and a corresponding one of the lenses 19 of the second lens plate 14 respectively arranged corresponding to the lenses 18 form a pair and have a common optical axis 25 (FIG. 8). Incidentally, the optical axis 25 mentioned here is assumed to be an axis parallel to the Z-axis and passing through the surface vertices 12a, 13a, 15a and 16a of the pair of lenses 18 and 19 facing each other as shown in FIG. 8 which will be explained later.

Both of the first lens plate 11 and the second lens plate 14 are formed of a material that allows light beams to pass through. Further, in the first lens plate 11, the lens surfaces 12 and the lens surfaces 13 are formed integrally with other parts of the first lens plate 11, and in the second lens plate 14, the lens surfaces 15 and the lens surfaces 16 are formed integrally with other parts of the second lens plate 14.

Figure 7:
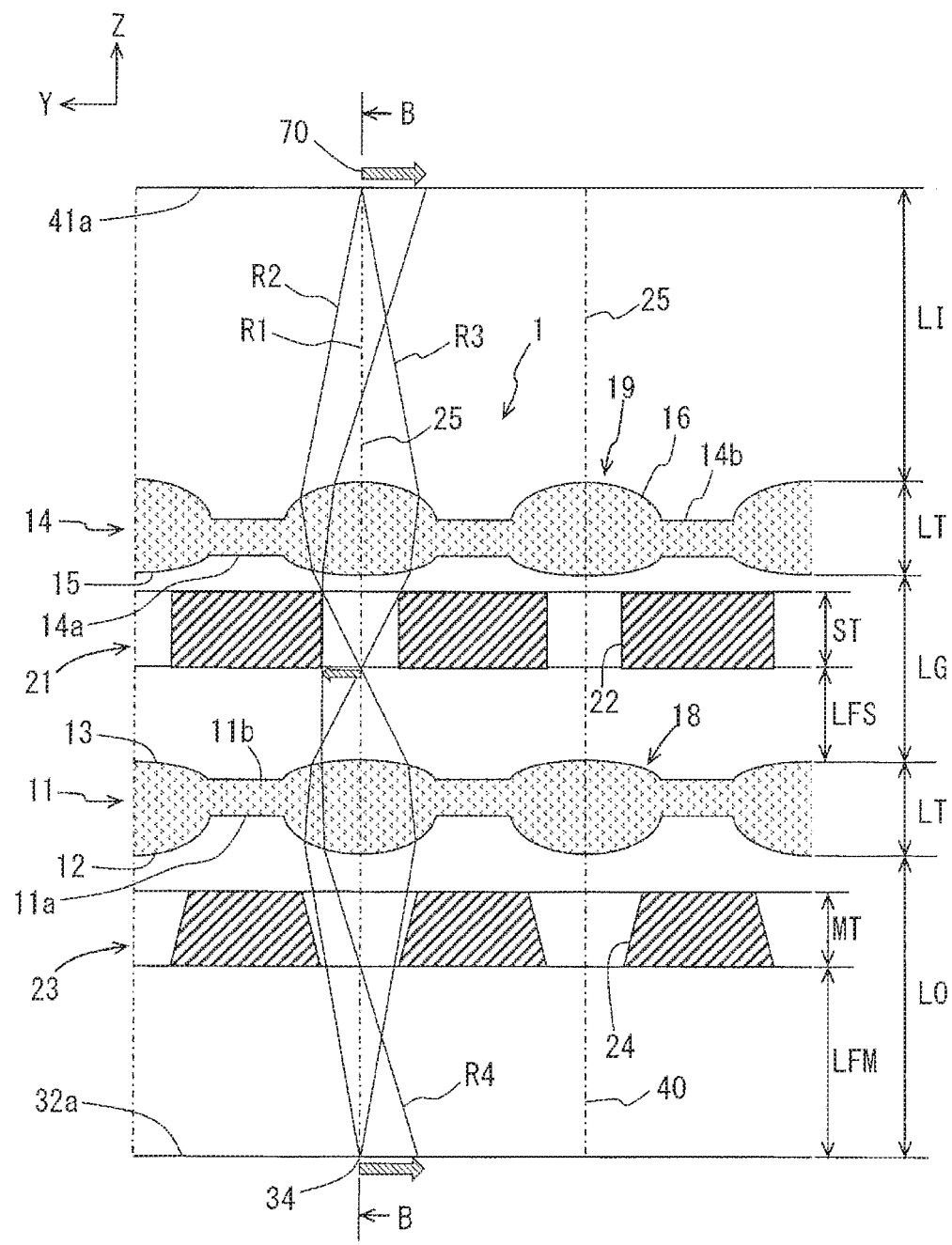
FIG. 7 is a cross-sectional view showing a cross section parallel with a Z-Y plane passing through surface vertices of lens surfaces after components in the exploded perspective view shown in FIG. 5 are combined together, for example, viewed from a −X-axis side.

FIG. 7 is a cross-sectional view showing a cross section parallel with a Z-Y plane passing through the surface vertices 16a of the lens surfaces 16 after the components in the exploded perspective view shown in FIG. 5 are combined together, for example, viewed from the −X-axis side, and FIG. 8 is a cross-sectional view taken along a line B-B shown in FIG. 7.

In FIG. 7, the light-emitting surface 32a of the LED array 32 exists below (i.e., on the −Z-axis side of) the mask 23, and the drum surface 41a of the photosensitive drum 41 serving as an imaging point exists above (i.e., on the +Z-axis side of) the second lens plate 14. The mask 23 and the light blocking plate 21 are formed of light blocking members that block so-called stray light and flare light other than the light beams forming the image of the LED array 32 (FIG. 2).

The openings 24 formed in the mask 23, the openings 22 formed in the light blocking plate 21, the lens surfaces 13 of the first lens plate 11, and the lens surfaces 15 of the second lens plate 14 are arranged to be situated at positions facing each other in the Z-axis direction (i.e., the direction in which a light beam enters and exits from the lens unit 1). Incidentally, as mentioned earlier, the lens surfaces 15 on the front surface 14a of the second lens plate 14 are arranged at the same positions as the lens surfaces 13 on the back surface 11b of the first lens plate 11, the lens surfaces 16 on the back surface 14b of the second lens plate 14, and the lens surfaces 12 on the front surface 11a of the first lens plate 11 as viewed from the upper side (i.e., +Z-axis side) in FIG. 7 or FIG. 8.

As shown in FIG. 7, the distance L0 from the light-emitting surface 32a of the LED array 32 to the lens surface 12 of the first lens plate 11, a surface interval LT (i.e., a lens thickness) between the lens surface 12 and the lens surface 13 of the first lens plate 11, a surface interval LG between the lens surface 13 of the first lens plate 11 and the lens surface 15 of the second lens plate 14, a surface interval LT (i.e., a lens thickness) between the lens surface 15 and the lens surface 16 of the second lens plate 14, and the distance LI from the lens surface 16 of the second lens plate 14 to the drum surface 41a of the photosensitive drum 41 serving as an imaging surface are respectively set, and further, a surface interval LFM between the light-emitting surface 32a of the LED array 32 and the mask 23, a surface interval LFS between the lens surface 13 of the first lens plate 11 and the light blocking plate 21, a thickness MT of the mask 23, and a thickness ST of the light blocking plate 21 are respectively set.

As shown in FIG. 8, the X-axis direction positions of the surface vertices 16a of the lens surfaces 16 (see FIG. 5) arranged in two lines on the back surface 14b of the second lens plate 14, the surface vertices 15a of the lens surfaces 15 arranged in two lines on the front surface 14a of the second lens plate 14, the surface vertices 12a of the lens surfaces 12 arranged in two lines on the front surface 11a of the first lens plate 11, and the surface vertices 13a of the lens surfaces 13 (see FIG. 5) arranged in two lines on the back surface 11b of the first lens plate 11, namely, the X-axis direction positions of the optical axes 25, are at positions separate from the width direction center CL of the LED array 32 to each side by the interval PXL.

Figure 9:
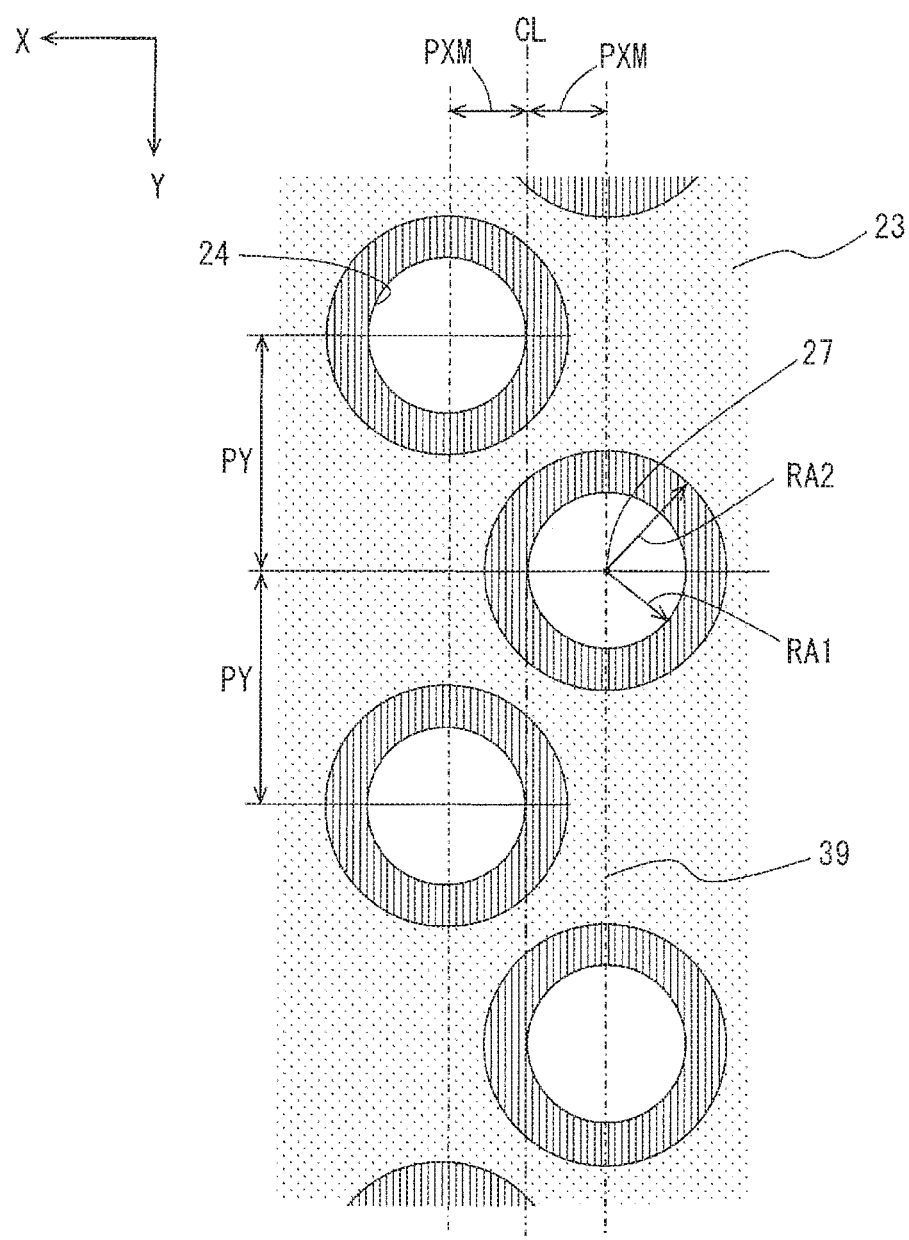
FIG. 9 is an arrangement diagram showing arrangement positions of openings formed in a mask shown in FIG. 5 viewed from the upper side (i.e., +Z-axis side) in FIG. 5.

Further, the X-axis direction positions of opening centers 26 of the openings 22 of the light blocking plate 21 are at positions separate from the width direction center CL of the LED array 32 to each side by an interval PXS, and the X-axis direction positions of opening centers 27 of the openings 24 of the mask 23 are at positions separate from the width direction center CL of the LED array 32 to each side by an interval PXM (FIG. 9). However, in the first embodiment, the interval PXM is set substantially equal to the interval PXS. As shown in a test which be described later, when PXS=0.92 mm, the same results were obtained in the range of 0.82 mm≤PXM≤1.02 mm. Therefore, the setting range of PXM is as follows:

$$0.9 \times PXS \leq PXM \leq 1.1 \times PXS.$$

Furthermore, in this example, as shown in FIG. 7, the optical axes 25 each being common to a pair of lenses 18 and 19, the opening centers 26 (FIG. 10) of the openings 22 of the light blocking plate 21 provided corresponding to the optical axes 25, and the opening centers 27 (FIG. 9) of the openings 24 of the mask 23 provided corresponding to the optical axes 25 are arranged to coincide with each other in the Y-axis direction positions. Put another way, the light blocking plate 21 and the mask 23 are configured so that the opening center 26 of an opening 22 and the opening center 27 of an opening 24 arranged corresponding to each optical axis 25 are situated on an imaginary plane 40 passing through the optical axis 25 and orthogonal to the Y-axis direction.

Incidentally, as mentioned earlier, the center of the LED array 32 in the X-axis direction is situated on the width direction center CL of the lens unit 1 in the width direction.

Figure 10:
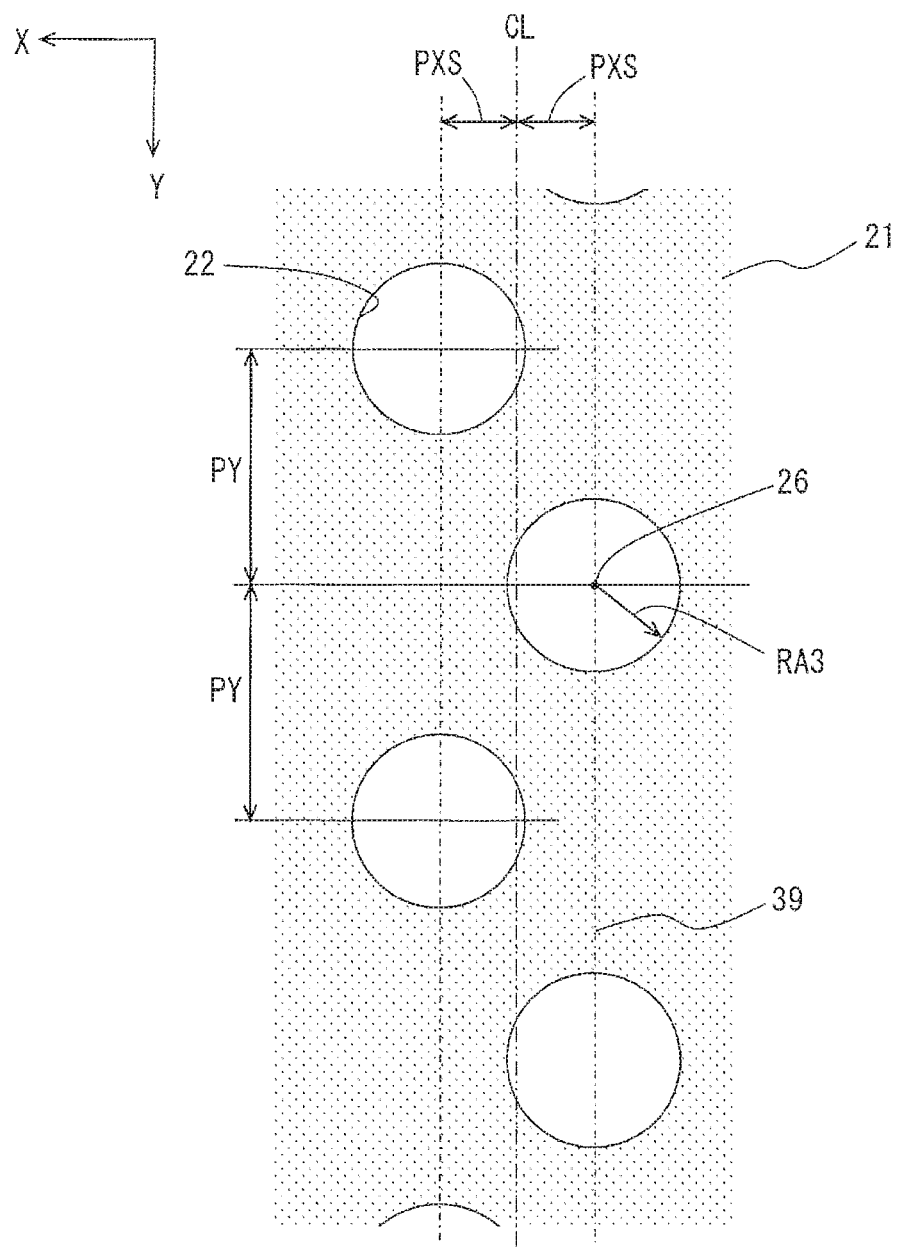
FIG. 10 is an arrangement diagram showing arrangement positions of openings formed in a light blocking plate shown in FIG. 5 viewed from the upper side (i.e., +Z-axis side) in FIG. 5.

FIG. 9 is an arrangement diagram showing arrangement positions of the openings 24 formed in the mask 23 shown in FIG. 5 viewed from the upper side (i.e., +Z-axis side) in FIG. 5, and FIG. 10 is an arrangement diagram showing arrangement positions of the openings 22 formed in the light blocking plate 21 shown in FIG. 5 viewed from the upper side (i.e., +Z-axis side) in FIG. 5. The shapes of the mask 23 and the light blocking plate 21 will be described further with reference to FIG. 9 and FIG. 10.

As shown in FIG. 9, in the mask 23, a plurality of openings 24 are arranged in two lines in a zigzag pattern. In the arrangement direction (i.e., Y-axis direction), the arrangement interval between adjacent openings 24 is PY, and the arrangement interval of the openings 24 in each line is twice PY (i.e., 2× PY). Further, the openings 24 are arranged so that the centers of the openings 24 in each line are situated at positions separate from the width direction center CL of the mask 23 (also being the width direction center of the lens unit 1) in the width direction (i.e., X-axis direction) to each side by PXM. The opening 24 is in a circular shape, and an opening radius RA1 on the surface facing the LED array 32 (FIG. 3) is smaller than an opening radius RA2 on the surface facing the first lens plate 11 (FIG. 5) and corresponds to a bottom surface of the mortar-shaped opening part. The mask 23 is formed of a material that blocks light beams from the LED array 32.

As shown in FIG. 10, in the light blocking plate 21, a plurality of openings 22 are arranged in two lines in a zigzag pattern. In the arrangement direction (i.e., Y-axis direction), the arrangement interval between adjacent openings 22 is PY, and the arrangement interval of the openings 22 in each line is twice PY (i.e., 2×PY). Further, the openings 22 are arranged so that the centers of the openings 22 in each line are situated at positions separate from the width direction center CL of the light blocking plate 21 (also being the width direction center of the lens unit 1) in the width direction (i.e., X-axis direction) to each side by PXS. The opening 22 is formed in a cylindrical shape to have an opening radius RA3. The light blocking plate 21 is formed of a material that blocks light beams from the LED array 32.

Incidentally, the interval PXM and the interval PXS are set equal to each other in this example as mentioned earlier.

On the basis of the above-described configurations, the lens unit 1 is configured so that the center positions of the openings 24 of the mask 23 and the openings 22 of the light blocking plate 21 and the optical axis positions of the lenses 18 and 19 respectively facing the mask 23 and the light blocking plate 21 differ from each other in the X-axis direction as shown in FIG. 8, which will be explained in detail later.

In regard to the configuration described above, the operation of the color printer 90 will be described first with reference to FIG. 1.

The surface of the photosensitive drum 41 of each toner image forming section 92-95 is electrically charged by the charging roller 42 to which voltage is applied by a non-illustrated power supply unit. Subsequently, when the charged surface of the photosensitive drum 41 reaches the vicinity of the LED head 3 due to the rotation of the photosensitive drum 41 in the direction of the arrow, the charged surface is exposed by the LED head 3 and an electrostatic latent image is formed on the surface of the photosensitive drum 41. The electrostatic latent image is developed by the development device 52 and a toner image is formed on the surface of the photosensitive drum 41.

On the other hand, a recording sheet 91 set in the sheet feed cassette 60 is extracted by the sheet feed roller 61 from the sheet feed cassette 60 and is conveyed by the conveyance rollers 62 and 63 to the vicinity of the transfer roller 80 and the transfer belt 81. Then, when the toner image on the surface of the photosensitive drum 41 obtained by the development reaches the vicinity of the transfer roller 80 and the transfer belt 81 due to the rotation of the photosensitive drum 41, the toner image on the surface of the photosensitive drum 41 is transferred onto the recording sheet 91 by the transfer belt 81 and the transfer roller 80 to which voltage is applied by the non-illustrated power supply unit. The above-described toner image transfer onto the recording sheet 91 is successively carried out in the toner image forming sections 92 to 95 that forms the toner images of the yellow (Y), magenta (M), cyan (C) and black (K) colors.

Subsequently, the recording sheet 91 having the toner images of the colors formed thereon is conveyed to the fixation device 53 by the rotation of the transfer belt 81. The fixation device 53 melts the toner images on the recording sheet 91 by heating and pressing the toner images and thereby fixes the toner images on the recording sheet 91. The recording sheet 91 after undergoing the fixation process is ejected by the conveyance rollers 64 and the ejection rollers 65 to the ejection section 66, by which the image forming operation is finished.

Next, the operation of the LED head 3 will be described below with reference to FIG. 3 and FIG. 8. When selected LED elements 34 of the LED array 32 emit light at intended light amounts based on image data, light beams from the LED elements 34 enter the lens unit 1 and are focused and imaged on the photosensitive drum 41.

As shown in FIG. 7 and FIG. 8, rays R1, R2, R3, etc. emitted from an LED element 34 in the vicinity of the optical axis of a lens surface 12 reaches the drum surface 41a via their respective paths, while a ray R4 emitted from an LED element 34 separate from the optical axis reaches the drum surface 41a via a path shown in FIG. 7, for example. Namely, the light beams from the LED array 32 enter the lens surfaces 12, form a reduced inverted image of the LED array 32 at a substantially intermediate position between the lens surfaces 13 and the lens surfaces 15, further enter the lens surfaces 15, and form an enlarged inverted image of the reduced inverted image at the imaging position. In short, an upright isometric image 70 of the LED array 32 is formed at the imaging position by the lens unit 1. Incidentally, the rays R1 and R4 in FIGS. 7 and 8 indicate principal rays.

In FIG. 7, the principal ray R1 is a ray emitted from an LED element 34 in the vicinity of a lens optical axis, while the principal ray R4 is a ray emitted from an LED element 34 separate from the lens optical axis. The lens unit 1 in this example has a telecentric configuration in which the principal rays R1 and R4 are parallel to the optical axis between the lens surface 13 of the first lens plate 11 and the lens surface 15 of the second lens plate 14.

A lens unit 1 in which two lenses are arranged to face each other has the telecentric configuration in the middle of the optical system in a case where the two lenses are substantially in the same shape and the distance LO from the object to the first lens 18 is substantially equal to the distance LI from the second lens 19 to the image (i.e., a light receiving surface).

In FIG. 8, the principal ray R1 and other rays R2 and R3 emitted from an LED element 34 travel along the paths shown in the figure. Since the lens unit 1 in this example has the telecentric configuration as mentioned above, the principal ray R1 is parallel to the optical axis between the lens surface 13 of the first lens plate 11 and the lens surface 15 of the second lens plate 14.

As shown in FIG. 9 and FIG. 10, the openings 24 of the mask 23 and the openings 22 of the light blocking plate 21 are in circular shapes, and as shown in FIG. 7 and FIG. 8, a light beam emitted from an LED element 34 spreads around the principal ray R1 in a circular shape and then enters the lenses 18 and 19. Accordingly, the openings 22 and 24, both formed in circular shapes, block high-aberration rays in a peripheral part of the circularly spreading light beam while letting through rays of low aberration, by which a bright image can be formed compared to a case where the opening shape is not circular.

Figure 11:
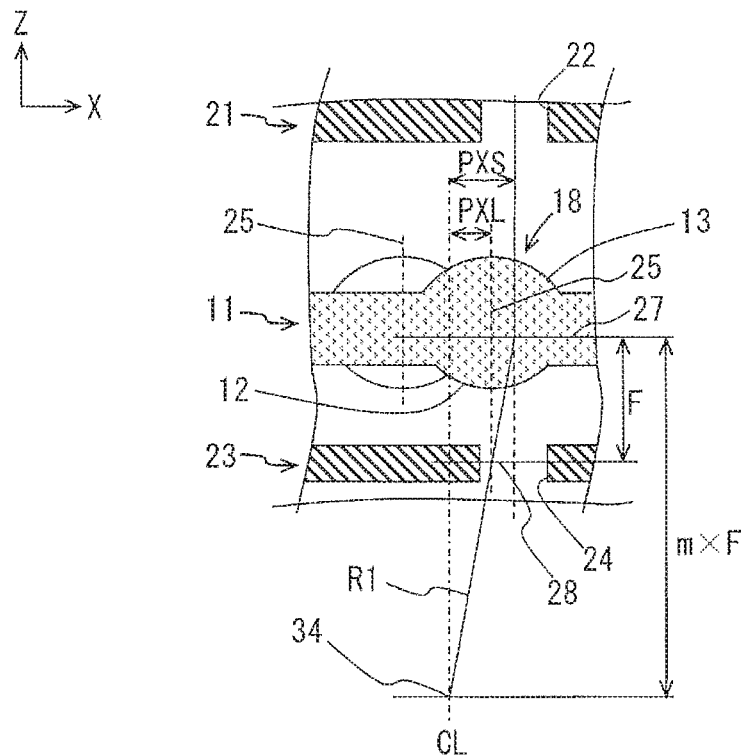
FIG. 11 is a diagram used for explaining optimum ranges of an interval PXL and an interval PXS (=PXM) in the first embodiment.
Figure 12:
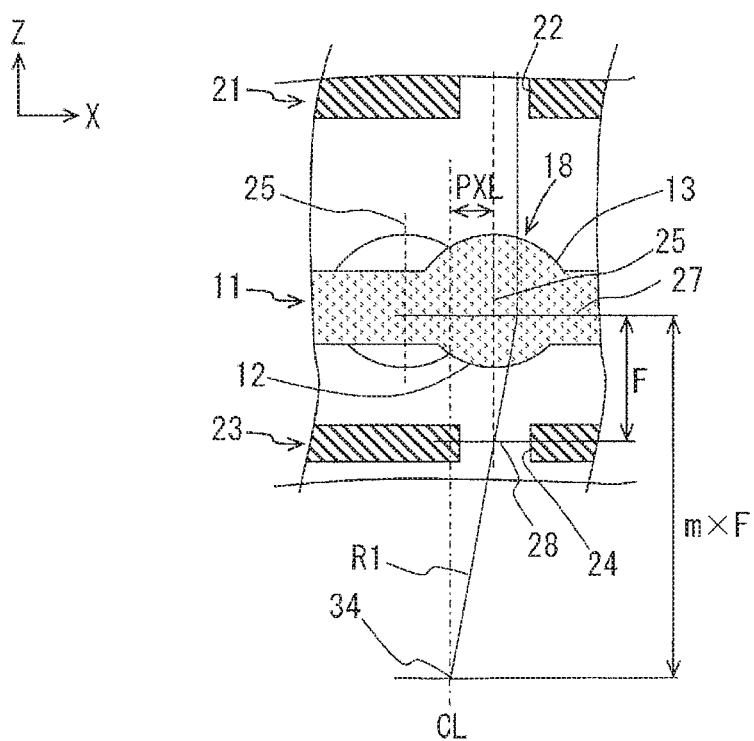
FIG. 12 is a diagram used for explaining the optimum ranges of the interval PXL and the interval PXS (=PXM) in the first embodiment.

FIG. 11 and FIG. 12 are diagrams used for explaining optimum ranges of the X-axis direction interval PXL from the width direction center CL to the optical axes of the lenses 18 formed in two lines on the first lens plate 11 and the X-axis direction interval PXS (=PXM) from the width direction center CL to the opening centers of the openings 24 of the mask 23 and the opening centers of the openings 22 of the light blocking plate 21 in the first embodiment. The optimum ranges of the interval PXL and the interval PXS (=PXM) will be explained below with reference to these diagrams.

FIG. 11 shows a condition for the principal ray R1 emitted from an LED element 34 to pass through the opening center 26 (FIG. 10) of a circular opening 22 of the light blocking plate 21. Let F represent the focal length of the lens 18 of the first lens plate 11 and m represent the ratio of the distance from the principal plane 27 of the lens 18 to the object surface to the focal length F, the distance from the object surface to the principal plane 27 equals (m×F). The principal plane 27 mentioned here is a first principal plane in the case where the reference character 28 represents an object focal point (i.e., a first focal point) and F represents a front-side focal length. The mask 23 having the openings 24 is arranged to be separate from the principal plane 27 of the lenses 18 of the first lens plate 11 in the Z-axis direction by the focal length F.

Under the setting condition of FIG. 11, the principal ray R1 passes through the opening center 26 (FIG. 10) of the opening 22, and thus the amount of rays blocked is the smallest at the opening 22. In contrast, at the opening 24 of the mask 23, the principal ray R1 passes through a peripheral part of the opening 24, and thus the amount of rays blocked by the mask 23 is greater as compared to a case where the principal ray R1 passes through the vicinity of the center of the opening 24.

FIG. 12 shows a condition for the principal ray R1 emitted from an LED element 34 to pass through the opening center 27 (FIG. 9) of a circular opening 24 of the mask 23. The distance from the object surface to the principal plane 27 is (m× F). Here, the principal plane is the first principal plane.

Under the setting condition of FIG. 12, the principal ray R1 passes through the opening center 27 of the opening 24, and thus the amount of rays blocked is the smallest at the opening 24. In contrast, at the opening 22 of the light blocking plate 21, the principal ray R1 passes through a peripheral part of the opening 22, and thus the amount of rays blocked by the light blocking plate 21 is greater as compared to a case where the principal ray R1 passes through the vicinity of the center of the opening 22.

Incidentally, in case where the opening centers 26 (FIG. 10) of the openings 22 of the light blocking plate 21 are arranged at positions shifted in the X-axis direction from the optical axes 25 of the lenses as in the lens unit 1 of the first embodiment, the shape of the opening 22 is desired to be a plane-symmetrical shape with respect to an imaginary plane 39 (FIG. 8) passing through the opening center 26 of the opening 22 and orthogonal to the X-axis direction. This is because the light from the lenses can be efficiently blocked/transmitted by the light blocking plate 21 and great effect can be achieved. The same goes for a case where the opening centers 27 (FIG. 9) of the openings 24 of the mask 23 are arranged at positions shifted in the X-axis direction from the optical axes 25 of the lenses. While the shapes of the openings 22 and 24 in this example are assumed to be the circular shape with which the greatest effect can be achieved, it is also possible to employ an elliptical shape, for example.

The lens unit 1 in the first embodiment has a configuration in which the openings 22 of the light blocking plate 21 and the openings 24 of the mask 23 are situated at positions in between the condition of FIG. 11 and the condition of FIG. 12, and thus the amount of rays blocked by the light blocking plate 21 and the mask 23 can be reduced and a bright image can be formed compared to a lens unit shown in FIG. 12 as a comparative example satisfying PXL is substantially equal to PXS and PXM, for example. As shown in a test which be described later, when PXS=0.92 mm, the same results were obtained in the range of 0.86 mm PXL 0.98 mm. Therefore, the setting range of PXL is as follows:

$$0.94 \times PXS \leq PXL \leq 1.06 \times PXS.$$

The configuration and a test result of the lens unit 1 in the first embodiment, as the reason for the above-described effect, will be described further below.

Incidentally, the interval PXS and the interval PXM are set equal to each other in this example as mentioned earlier.

Under the setting condition of FIG. 11, the interval PXL and the interval PXS satisfy a relationship of $$PXL/PXS=(m-1)/m.$$

That is, the interval PXL and the interval PXS satisfy a relationship of $$PXL=PXS \cdot (m-1)/m$$

or $$PXS=PXL \cdot m/(m-1). \tag{1}$$

Under the setting condition of FIG. 12, the interval PXL and the interval PXS satisfy a relationship of $$PXL=PXS \tag{2}.$$

Therefore, a relative moving range of the opening 22, the opening 24 and the lens 18 from the setting condition of FIG. 11 in which the principal ray R1 passes through the center of the opening 22 to the setting condition of FIG. 12 in which the principal ray R1 passes through the center of the opening 24 satisfies a relationship of $$PXS \cdot (m-1)/m < PXL < PXS$$

or $$PXL < PXS < PXL \cdot m/(m-1). \tag{3}$$

As shown in a test which will be described later, when m=3, the following relationship is satisfied:

$$(2/3) \cdot PXS < PXL < PXS$$

or $$PXL < PXS < PXL \cdot 3/2. \tag{4}$$

Further, when PXS=0.92 mm in the configuration of the first embodiment, for example, the setting range of PXL is as follows:

$$0.61 \text{ (mm)} < PXL < 0.92 \text{ (mm)} \tag{5}.$$

Next, a description will be given of a light amount evaluation test performed by preparing LED heads employing lens units differing in the condition as test samples in order to examine a change in the light amount at an imaging section caused by a change in the numerical value of the interval PXL (PXS=0.92 mm).

Table 1 lists the dimensions of parts (see FIGS. 6, 7, 9 and 10) of the lens unit 1 of the LED head 3 in the first embodiment of the present invention prepared as a test sample. Incidentally, a lens unit of a test sample prepared as a comparative example for the test also has the dimensions shown in Table 1.

TABLE 1

| ITEM | DIMENSION (mm) | REMARKS |
|---|---|---|
| LT (lens thickness) | 1.3 | maximum thickness between front and back lens surfaces of each lens plate 11, 14 (FIG. 7) |
| LG (interval) | 2.2 | surface interval between lens surface 13 and lens surface 15 (FIG. 7) |
| RY (distance) | 0.6 | arrangement interval of lenses 18 and 19 in y-axis direction (FIGS. 6, 7) |
| RL1 (radius) | 0.6 | radius of each lens surface 12, 16 (FIG. 6) |
| RL2 (radius) | 0.55 | radius of each lens surface 13, 15 (FIG. 6) |
| MT (thickness) | 1.0 | thickness of mask 23 (FIG. 7) |

TABLE 1-continued

| ITEM | DIMENSION (mm) | REMARKS |
|---|---|---|
| LFM (interval) | 1.9 | surface interval between light-emitting surface 32a of LED array 32 and mask 23 (FIG. 9) |
| RA1 (opening radius) | 0.35 | opening radius of opening 24 (small radius side) (FIG. 9) |
| RA2 (opening radius) | 0.4 | opening radius of opening 24 (large radius side) (FIG. 9) |
| ST (thickness) | 1.0 | thickness of light blocking plate 21 (FIG. 7) |
| LFS (interval) | 1.1 | surface interval between lens surface 13 of first lens plate 11 and light blocking plate 21 (FIG. 9) |
| RA4 (opening radius) | 0.4 | opening radius of opening 22 (small radius side) |

Next, lens surface shapes of the lens surfaces in the LED head 3 of the first embodiment of the present invention prepared as a test sample and an LED head used as the test sample as the comparative example will be explained below with reference to Table 2. Here, the lens unit 1 of the first embodiment and the lens unit used as the test sample as the comparative example have the same lens surface shapes of the lens surfaces.

Each lens surface is in a rotational aspherical shape and is represented by a curvature radius and aspherical surface coefficients of the fourth, sixth and eighth orders as shown in Table 2. Incidentally, the lens surface 16 has the same shape as the lens surface 12, namely, a shape obtained by rotating the lens surface 12 by 180 degrees around a rotation axis in the X-axis direction (i.e., the width direction of the lens unit 1). The lens surface 15 has the same shape as the lens surface 13, namely, a shape obtained by rotating the lens surface 13 by 180 degrees around a rotation axis in the X-axis direction. In both of the lens unit 1 of the first embodiment prepared as a test sample and the lens unit prepared as a test sample as the comparative example, lens surfaces are arranged for a distance of 212 mm in the arrangement direction of the lens surfaces (i.e., Y-axis direction).

TABLE 2

| LENS SURFACE | ITEM | LENS UNIT 1 |
|---|---|---|
| lens surface 12 | curvature radius | 0.959674 |
| | aspherical surface coefficient - fourth order | −0.321867 |
| | aspherical surface coefficient - sixth order | −0.376107 |
| | aspherical surface coefficient - eighth order | −0.131335 |
| lens surface 13 | curvature radius | −0.950425 |
| | aspherical surface coefficient - fourth order | −0.362602 |
| | aspherical surface coefficient - sixth order | −0.764623 |
| | aspherical surface coefficient - eighth order | 1.12527 |

Both of the first lens plate 11 and the second lens plate 14 were made of APEL APL5513TL (produced by Mitsui Chemicals, Inc., APEL is a registered trademark of Mitsui Chemicals, Inc.) as cycloolefin resin. The refractive index n of this material at the wavelength 770 nm of the LED element 34 is n=1.5373 at 25° C. temperature.

The light blocking plate 21 and the mask 23 were made of Iupilon H-4000 (produced by Mitsubishi Engineering-Plastics Corporation, Iupilon is a registered trademark of Mitsubishi Engineering-Plastics Corporation) as polycarbonate resin. In the lens units prepared as the test samples in the first embodiment and the comparative example, the focal length F is 1.1662 mm. The back focus is 0.6263 mm and the distance from the lens surface to the principal plane 27 (i.e., a first principal plane) is 0.5399 mm.

Figure 13:
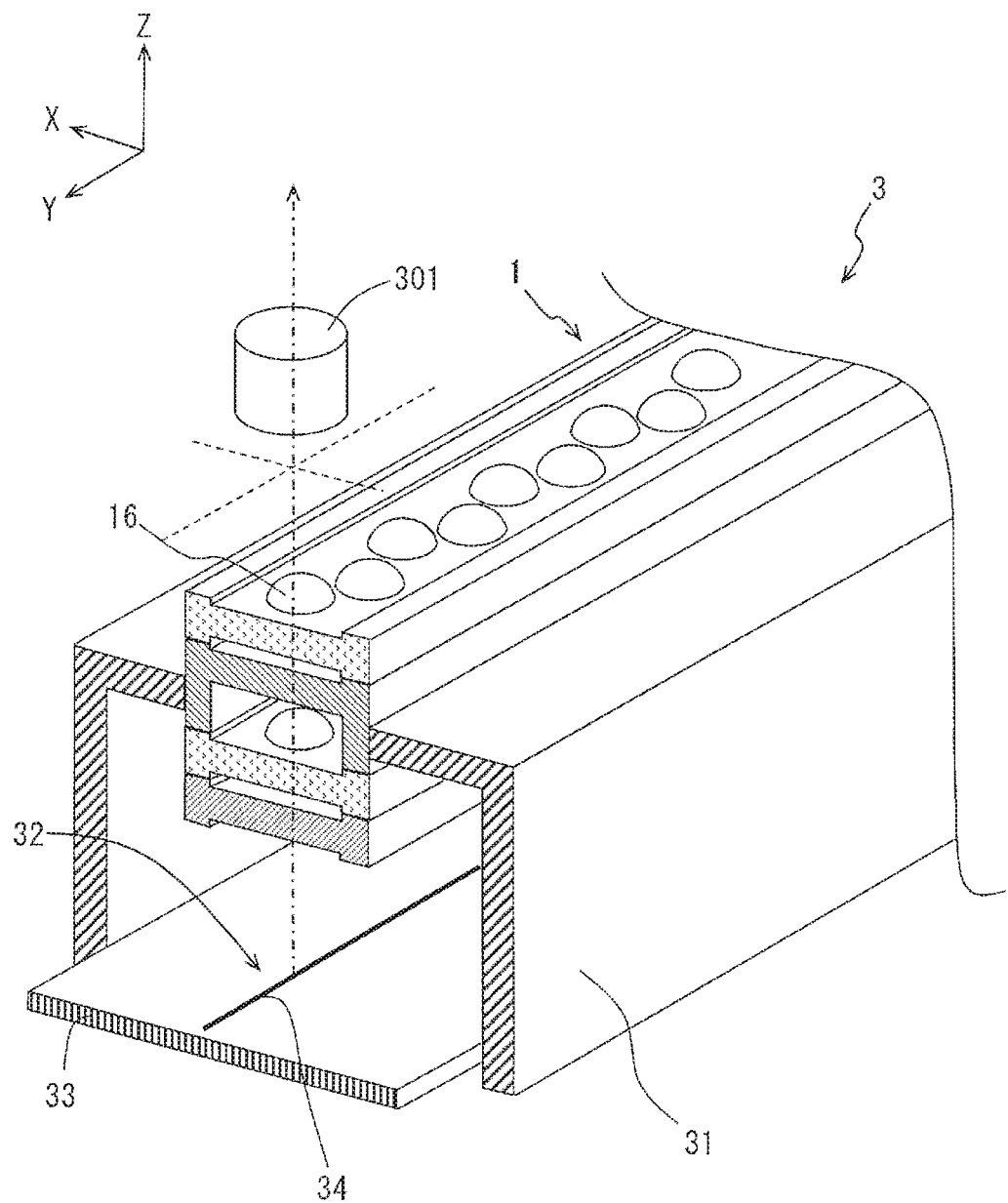
FIG. 13 is a perspective view schematically showing a part of the LED head and a photosensor as a part of an optical image measuring instrument for measuring the light amount of the LED head.
Figure 14:
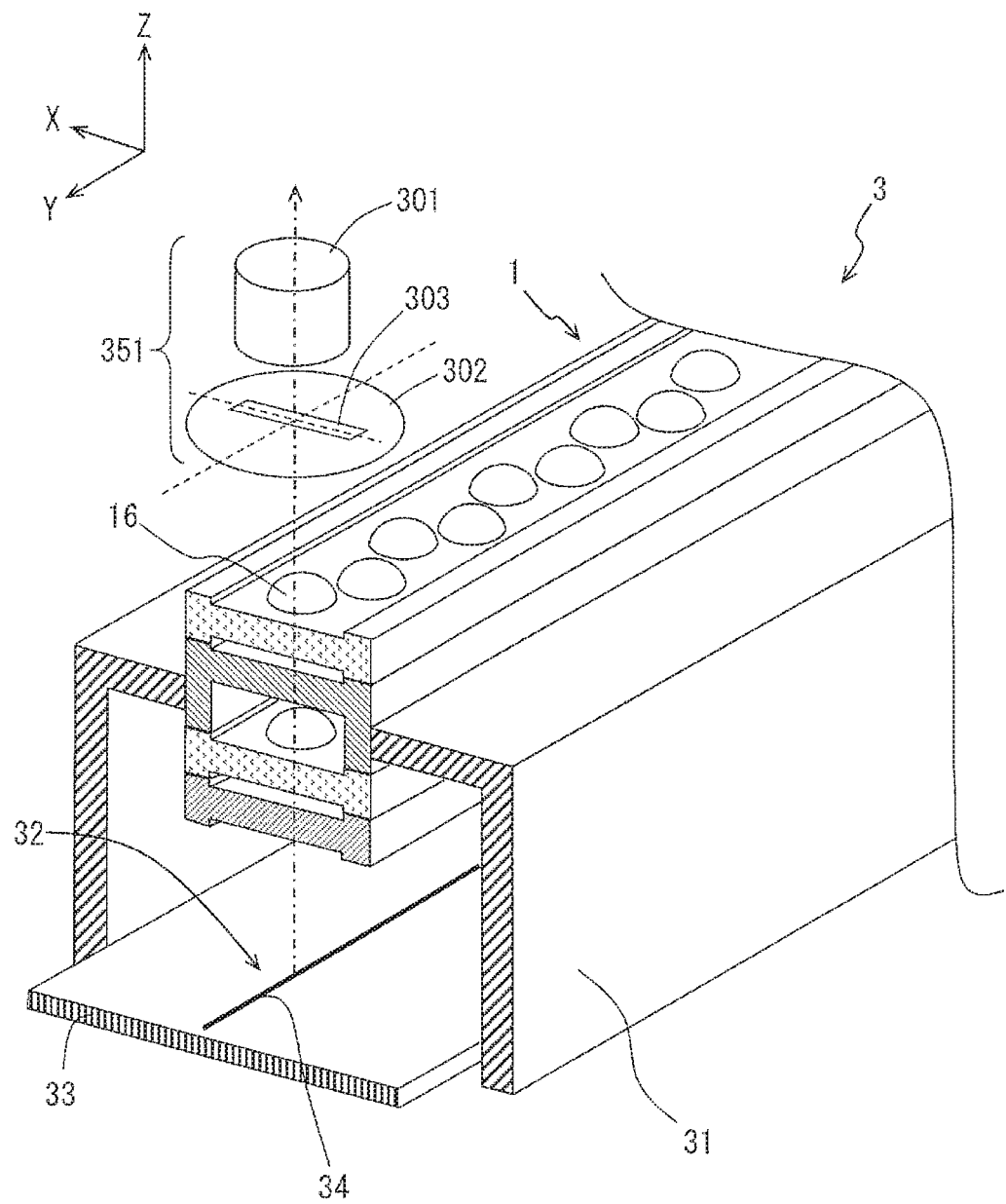
FIG. 14 is a perspective view schematically showing a part of the LED head and a slit sensor as a part of the optical image measuring instrument for measuring a slit waveform of the LED head.

Next, an optical image measuring instrument for measuring optical properties of the LED head 3 will be explained below with reference to FIG. 13 and FIG. 14. FIG. 13 is a perspective view schematically showing a part of the LED head 3 and a photosensor 301 as a part of the optical image measuring instrument for measuring the light amount of the LED head 3. FIG. 14 is a perspective view schematically showing a part of the LED head 3 and a slit sensor 351 as a part of the optical image measuring instrument for measuring a slit waveform of the LED head 3.

First, the optical image measuring instrument for measuring the illuminance will be explained with reference to FIG. 13. In FIG. 13, the photosensor 301 of the optical image measuring instrument measures the light amount of the image at a position separate from the imaging surface of the lens unit 1 of the LED head 3, i.e., the lens surface 16 on the photosensitive drum 41's side, by the distance LI in regard to every LED element 34. For the measurement, the optical image measuring instrument controls the movement of the photosensor 301 and the light emission of the LED head 3, makes the photosensor 301 scan in the lengthwise direction of the LED head 3 (i.e., Y-axis direction), and operates so that the position of the photosensor 301 and the imaging position of each LED element 34 of the LED head 3 lighted up successively coincide with each other in the Y-axis direction.

When the illuminance is measured in the configuration described above, the optical image measuring instrument lights up the LED elements 34 of the LED head 3 dot by dot at the same electric current value and measures the light amount by use of the photosensor 301.

Next, the optical image measuring instrument for measuring a light beam diameter will be explained with reference to FIG. 14. In FIG. 14, the slit sensor 351 of the optical image measuring instrument is formed of the photosensor 301 and a light blocking plate 302 having a slit 303 formed therein. The light blocking plate 302 is formed so that the slit 303 extends in the width direction of the lens unit 1 (i.e., X-axis direction) which is orthogonal to the arrangement direction of the LED elements 34 (i.e., Y-axis direction). The light beam that passed through the slit 303 is transduced by the photosensor 301 into an electric signal.

For the measurement of the light beam diameter, the optical image measuring instrument controls the movement of the slit sensor 351 and the light emission of the LED head 3, makes the slit sensor 351 scan in the lengthwise direction of the LED head 3 (i.e., Y-axis direction), and measures the light amount distribution of the images of the LED elements 34 lighted up successively.

Next, the operation of the optical image measuring instrument used for measuring the light beam diameter will be described with reference to FIG. 13 and FIG. 14.

First, in the optical image measuring instrument, the configuration shown in FIG. 13 using the photosensor 301 is prepared and light amount correction for making the LED head 3 light up every dot at a constant light amount is carried out. For this correction, first, the LED elements 34 of the LED head 3 are lighted up dot by dot at the same electric current value and the light amount of each dot is measured with the photosensor 301. Subsequently, based on the measured light amount values of all the LED elements 34, an electric current value for each LED element 34 that makes the light amounts of all the LED elements 34 equal to each other is calculated as a light amount correction value.

Subsequently, the configuration shown in FIG. 14 using the slit sensor 351 is prepared and the optical image measuring instrument measures the light beam diameter of every dot of the LED head 3. For the measurement of the light beam diameter, the LED elements 34 of the LED head 3 are lighted up dot by dot (i.e., one by one) at the light amount correction value and the slit waveform, as the waveform of the image of the LED element 34 lighted up, is measured with the slit sensor 351. Further, the average value of the peaks of the measured slit waveforms of all the LED elements 34 is calculated. The width of each slit waveform at a 10% height of the peak average value is determined as the light beam diameter.

Next, test results will be described below.

Figure 15:
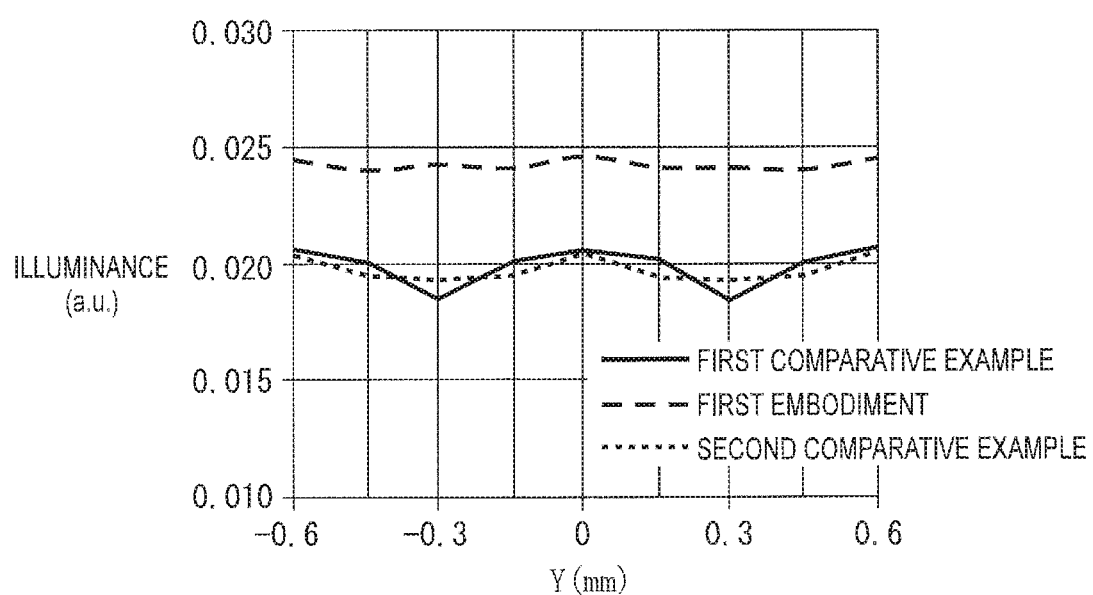
FIG. 15 is a graph showing a test result of an illuminance distribution test (1) performed in the first embodiment by preparing LED heads as a first example and first and second comparative examples as test samples.

FIG. 15 is a graph showing a test result of an illuminance distribution test (1) performed by preparing the following LED heads as a first example and first and second comparative examples as test samples:

In the LED head as the first comparative example, the interval PXS=0.92 mm and the interval PXL=0.92 mm.

In the LED head as the first example, the interval PXS=0.92 mm and the interval PXL=0.76 mm.

In the LED head as the second comparative example, the interval PXS=0.92 mm and the interval PXL=0.61 mm.

The rest of the configuration of each LED head is the same as that of the LED head 3 in the first embodiment described earlier. Incidentally, as shown in FIGS. 11 and 12, the interval PXL is the interval from the width direction center CL to the lens 18 in the X-axis direction, and the interval PXS is the interval from the width direction center CL to the opening 22, 24 in the X-axis direction.

In the illuminance distribution test (1), the illuminance obtained with each of the LED heads as the first example and the first and second comparative examples was measured with the optical image measuring instrument shown in FIG. 13, in which the illuminance of the image at each position was measured while moving the photosensor 301 shown in FIG. 13 with reference to the central axis of a certain lens (i.e., Y=0) to the central axis of an adjacent lens. The graph of FIG. 15 shows the result of the measurement.

In the graph of FIG. 15, the vertical axis represents the illuminance and the horizontal axis represents the position of the movement of the photosensor 301. Thus, each of the positions at −0.6 mm, 0.0 mm and 0.6 mm represents the illuminance of an image close to the central axis of a lens 18 (FIG. 11), and each of the positions at −0.3 mm and 0.3 mm represents the illuminance of an image situated at a boundary between adjacent lenses. Here, the arrangement interval PY (FIG. 6) of the lenses 18 in the arrangement direction (i.e., Y-axis direction) is PY=0.6 mm. Incidentally, since the arrangement pitch PD of the LED elements 34 is 0.021167 mm, approximately twenty-eight LED elements 34 are arranged between lenses.

As is clear from the aforementioned inequality (5), the LED head as the first example is an LED head employing the configuration of the first embodiment, the LED head as the second comparative example corresponds to the condition on the left side of the inequality (3) according to the setting condition of FIG. 11, and the LED head as the first comparative example corresponds to the condition on the right side of the inequality (3) according to the setting condition of FIG. 12. Incidentally, it is assumed here that m=3.

As shown in the measurement graph of FIG. 15, with the LED head as the first example, a brighter image was formed in comparison with the LED heads as the first and second comparative examples, and a PV value as the difference between the maximum value and the minimum value in the illuminance distribution was also smaller in comparison with the first and second comparative examples.

Figure 16A:
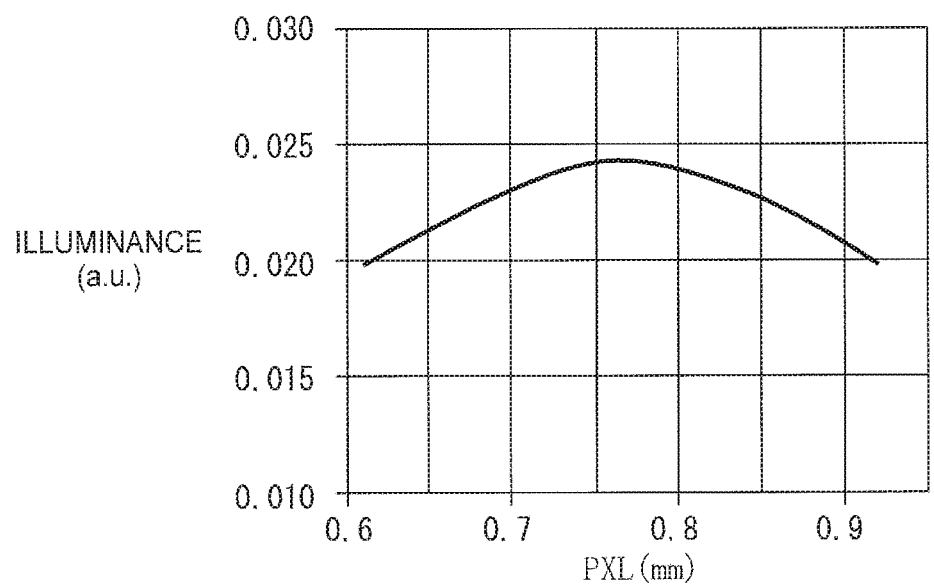
Figure 16B:
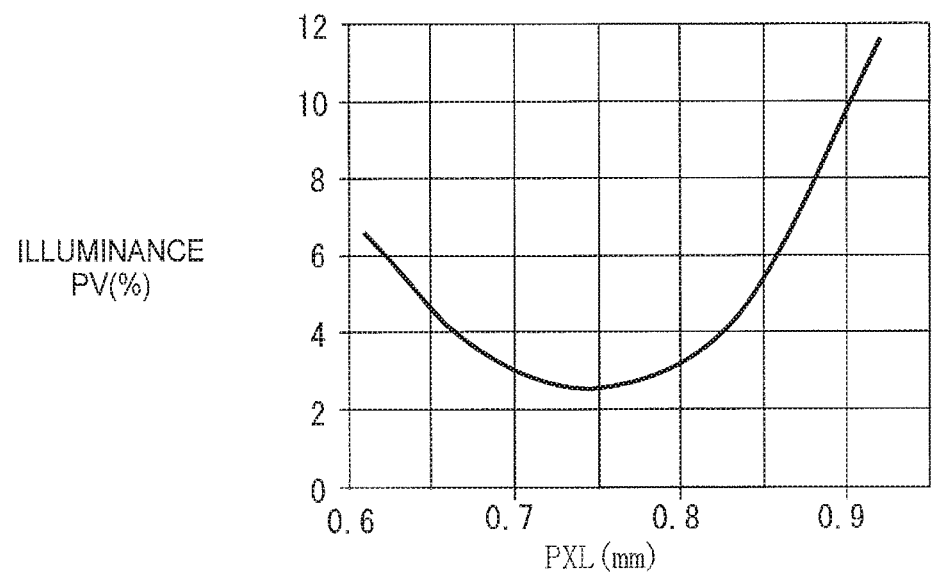

FIGS. 16A and 16B are graphs showing test results of an illuminance distribution test (2) performed by preparing LED heads employing the configuration of the first embodiment to satisfy the following conditions as test samples:

$PXS=0.92$ mm $0.61$ (mm)$<PXL<0.91$ (mm), and $M=3$.

In the illuminance distribution test (2), the illuminance obtained with each of the above-described LED heads was measured with the optical image measuring instrument shown in FIG. 13, in which the illuminance of the image at each position was measured in regard to each test sample while moving the photosensor 301 with reference to the central axis of a certain lens to the central axis of an adjacent lens similarly to the illuminance distribution test (1). The measurement graph of FIG. 16A shows the average of the illuminance distributions measured at each position, and FIG. 16B shows the PV value calculated as the difference between the maximum value and the minimum value in the illuminance distribution, wherein the horizontal axis represents the interval PXL in the test sample.

As shown in the measurement graph of FIG. 16A, when LED heads whose PXL value is within a range of 0.61 mm to 0.92 mm are used as test samples, the illuminance exhibits a distribution in which the illuminance hits the maximum approximately at the center value of the range and then decreases with the increase in the separation from the center value, and as shown in the measurement graph of FIG. 16B, the PV value exhibits a distribution in which the PV value hits the minimum approximately at the center value of the range and then increases with the increase in the separation from the center value.

Figure 17:
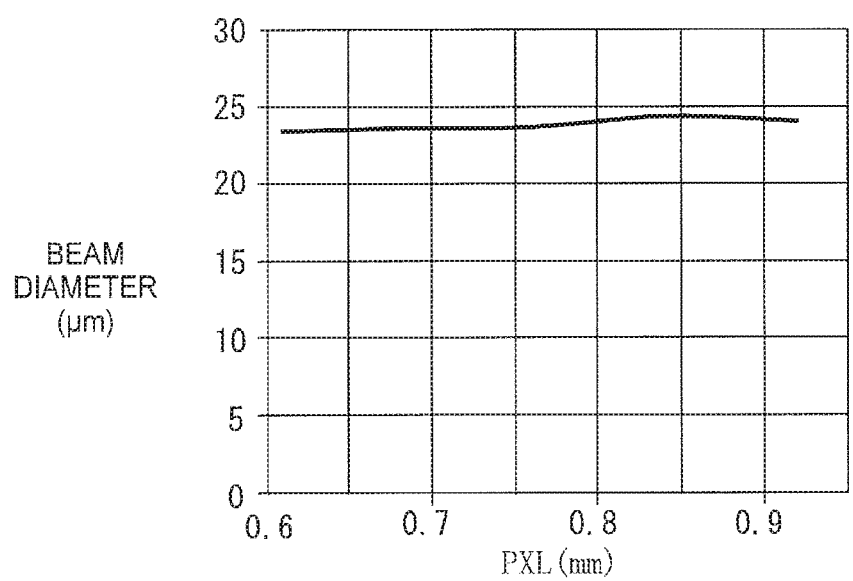
FIG. 17 is a graph showing a test result of a light beam diameter measurement test in the first embodiment.

FIG. 17 is a graph showing a test result of a light beam diameter measurement test performed by preparing LED heads employing the configuration of the first embodiment to satisfy the following conditions as test samples:

$PXS=0.92$ mm $0.61$ (mm)$<$interval $PXL<0.91$ (mm), and $M=3$.

In the light beam diameter measurement test, the light beam diameter obtained with each of the above-described LED heads was measured with the optical image measuring instrument shown in FIG. 14 according to the measurement method described earlier. The measurement graph of FIG. 17 shows the result of the measurement, wherein the horizontal axis represents the interval PXL in the test sample.

As shown in the measurement graph of FIG. 17, when LED heads whose PXL value is within the range of 0.61 mm to 0.92 mm were used as test samples, the light beam diameter rarely changed within the range and was approximately 24 µm.

As described above, according to the lens unit of the first embodiment, among the rays forming the image, rays having aberration can be blocked and the amount of light blockage can be held down, by which a clear and bright image can be obtained.

Second Embodiment

Figure 18:
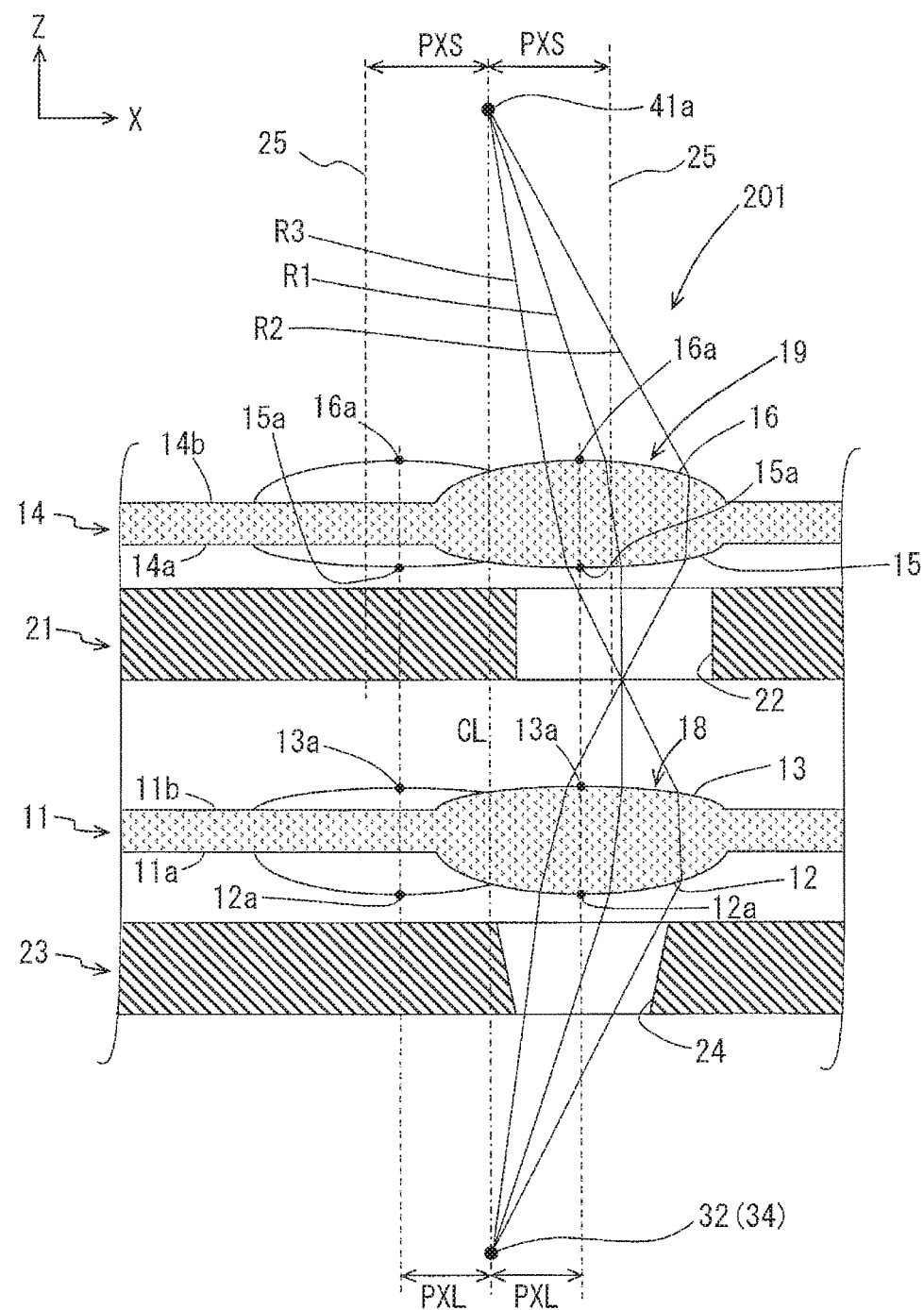
FIG. 18 is a cross-sectional view showing a lens unit in a second embodiment showing a cross section at the same position as in the cross-sectional view of FIG. 8 showing the cross section of the lens unit in the first embodiment.

FIG. 18 is a cross-sectional view showing a lens unit 201 in a second embodiment of the present invention showing a cross section at the same position as in the cross-sectional view of FIG. 8 showing the cross section of the lens unit 1 in the first embodiment.

A color printer employing the lens unit 201 differs from the color printer employing the lens unit 1 in the above-described first embodiment shown in FIG. 8 mainly in the relative positional relationship between the interval PXL and the interval PXS. Thus, repeated description is omitted for each part of the color printer employing this lens unit 201 in common with the color printer 90 (FIG. 1) in the above-described first embodiment while assigning the part the same reference character as in the first embodiment or omitting illustration thereof, and the difference from the first embodiment will be mainly described below. Incidentally, FIG. 1 will be referred to as needed in the following description since the principal part configuration of the color printer in the second embodiment is basically in common with the principal part configuration of the color printer in the first embodiment shown in FIG. 1 except for the lens unit.

As shown in FIG. 18, in the lens unit 201 in the second embodiment, the interval PXM from the width direction center CL of the LED array 32 to the openings 24 of the mask 23 in the X-axis direction is set equal to the interval PXL to the surface vertices 16a, 15a of the lenses 19 and the surface vertices 13a, 12a of the lenses 18 in the same direction, namely, the interval PXL to the optical axes 25 as:

$$PXM=PXL,$$

and the openings 22 of the light blocking plate 21 are formed at positions at the interval PXS from the width direction center CL of the LED array 32 in the X-axis direction.

Figure 19:
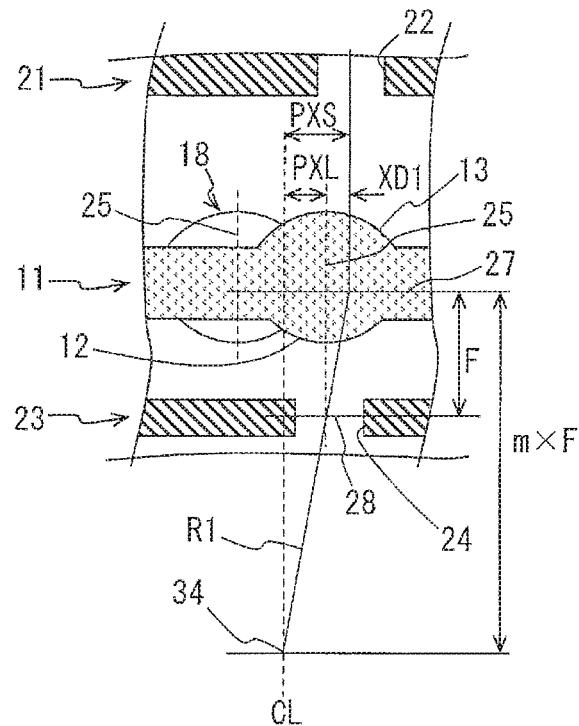
FIG. 19 is a diagram used for explaining optimum ranges of an interval PXL (=PXM) and an interval PXS in the second embodiment.
Figure 20:
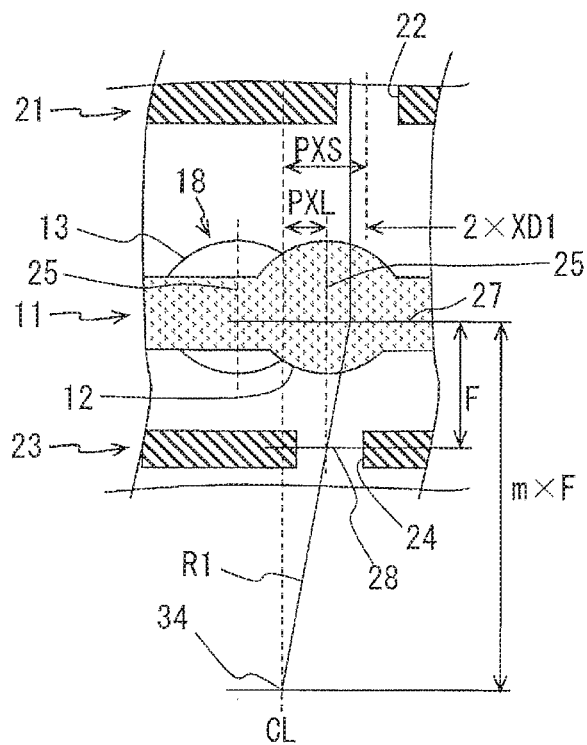
FIG. 20 is a diagram used for explaining optimum ranges of the interval PXL (=PXM) and the interval PXS in the second embodiment.

FIG. 19 and FIG. 20 are diagrams used for explaining optimum ranges of the X-axis direction interval PXL (=PXM) from the width direction center CL to the optical axes of the lenses 18 formed in two lines on the first lens plate 11 and the opening centers of the openings 24 of the mask 23 and the X-axis direction interval PXS from the width direction center CL to the opening centers of the openings 22 of the light blocking plate 21 in the second embodiment. The optimum ranges of the interval PXL (=PXM) and the interval PXS will be explained below with reference to these diagrams.

FIG. 19 shows a condition for the principal ray R1 emitted from an LED element 34 to pass through the opening center 26 (FIG. 10) of a circular opening 22 of the light blocking plate 21. Let F represent the focal length of the lens 18 of the first lens plate 11 and m represent the ratio of the distance from the principal plane 27 of the lens 18 to the object surface to the focal length F, the distance from the object surface to the principal plane 27 equals (m×F). Here, the principal plane 27 is the first principal plane. The mask 23 having the openings 24 is arranged to be separate from the principal plane 27 of the lenses 18 of the first lens plate 11 in the Z-axis direction by the focal length F.

Under the setting condition of FIG. 19, the principal ray R1 passes through the opening center 26 (FIG. 10) of the opening 22, and thus the amount of rays blocked is the smallest at the opening 22, and also at the opening 24 of the mask 23, the principal ray R1 passes through the center of the opening 24, and thus the amount of rays blocked is the smallest also at the opening 24. The difference between the values of the interval PXS and the interval PXL in the setting condition of FIG. 19 will be referred to as XD1.

FIG. 20 shows a setting condition in which the difference between the interval PXS and the interval PXL equals (2×XD1). In this case, the principal ray R1 passes through a peripheral part of the circular opening 22 of the light blocking plate 21, and thus the amount of rays blocked by the light blocking plate 21 is greater as compared to a case where the principal ray R1 passes through the vicinity of the center of the opening 22 and the brightness of the image is approximately equal to that in the aforementioned setting condition of FIG. 12 in which the interval PXS and the interval PXL are equal to each other.

The lens unit 201 in the second embodiment has a configuration in which the opening 22 of the light blocking plate 21 takes on a position in between the setting condition of FIG. 12 and the setting condition of FIG. 20, by which the amount of rays blocked by the light blocking plate 21 can be made smaller and a brighter image can be formed as compared to the lens unit in FIG. 12 as a comparative example in which PXL=PXS, for example.

The configuration and a test result of the lens unit 201 in the second embodiment, as the reason for the above-described effect, will be described further below. Incidentally, the interval PXL and the interval PXM are set equal to each other in this example as mentioned earlier.

A range of the interval PXS for making the opening 22 of the light blocking plate 21 be situated in between the setting condition of FIG. 12 and the setting condition of FIG. 20 satisfies the following relational expression:

$$PXL<PXS<PXL+2\times XD1 \qquad (6).$$

According to the setting condition of FIG. 19, the difference XD1 and the interval PXL satisfy:

$$XD1/PXL=1/(m-1)$$

and thus the following relationship holds further:

$$XD1=PXL/(m-1) \qquad (7).$$

Accordingly, the expression (6) turns into:

$$PXL<PXS<PXL\cdot(m+1)/(m-1) \qquad (8).$$

As shown in a test which will be described later, when m=3, the following relationship is satisfied:

$$PXL<PXS<2\cdot PXL \qquad (9).$$

Further, when PXL=0.92 mm in the configuration of the second embodiment, for example, the setting range of PXS turns into:

$$0.92 \text{ (mm)}<PXS<1.84 \text{ (mm)} \qquad (10).$$

Incidentally, since PXM=PXL in this example, the above expression (9) may be transformed into:

$$PXM<PXS<2\cdot PXM \qquad (11).$$

Next, a description will be given of a light amount evaluation test performed by preparing LED heads employing lens units differing in the condition as test samples in order to examine a change in the light amount at the imaging section caused by a change in the numerical value of the interval PXS (PXL=0.92 mm).

The dimensions of the parts (see FIGS. 6, 7, 9 and 10) of the lens unit 201 of the LED head 3 in the second embodiment of the present invention and a lens unit as a comparative example prepared as test samples are the same as the numerical values in Table 1 showing the dimensions of the parts in the first embodiment.

Each lens surface is in a rotational aspherical shape and is represented by a curvature radius and aspherical surface coefficients of the fourth, sixth and eighth orders as shown in Table 3. Incidentally, the lens surface 16 has the same shape as the lens surface 12, namely, a shape obtained by rotating the lens surface 12 by 180 degrees around a rotation axis in the X-axis direction (i.e., the width direction of the lens unit 201). The lens surface 15 has the same shape as the lens surface 13, namely, a shape obtained by rotating the lens surface 13 by 180 degrees around a rotation axis in the X-axis direction. In both of the lens unit 201 of the second embodiment prepared as a test sample and the lens unit prepared as a test sample as the comparative example, lens surfaces are arranged for a distance of 212 mm in the arrangement direction of the lens surfaces (i.e., Y-axis direction).

TABLE 3

| LENS SURFACE | ITEM | LENS UNIT 1 |
|---|---|---|
| lens surface 12 | curvature radius | 1.43674 |
|  | aspherical surface coefficient - fourth order | −0.516071 |
|  | aspherical surface coefficient - sixth order | −0.0166369 |
|  | aspherical surface coefficient - eighth order | −2.44145 |
| lens surface 13 | curvature radius | −0.801664 |
|  | aspherical surface coefficient - fourth order | 0.287374 |
|  | aspherical surface coefficient - sixth order | −0.272453 |
|  | aspherical surface coefficient - eighth order | 0.745162 |

In the lens units prepared as the test samples in the second embodiment and the comparative example, the focal length F is 1.2017 mm. The back focus is 0.8217 mm and the distance from the lens surface to the principal plane 27 (i.e., a first principal plane) is 0.3800 mm.

Figure 21:
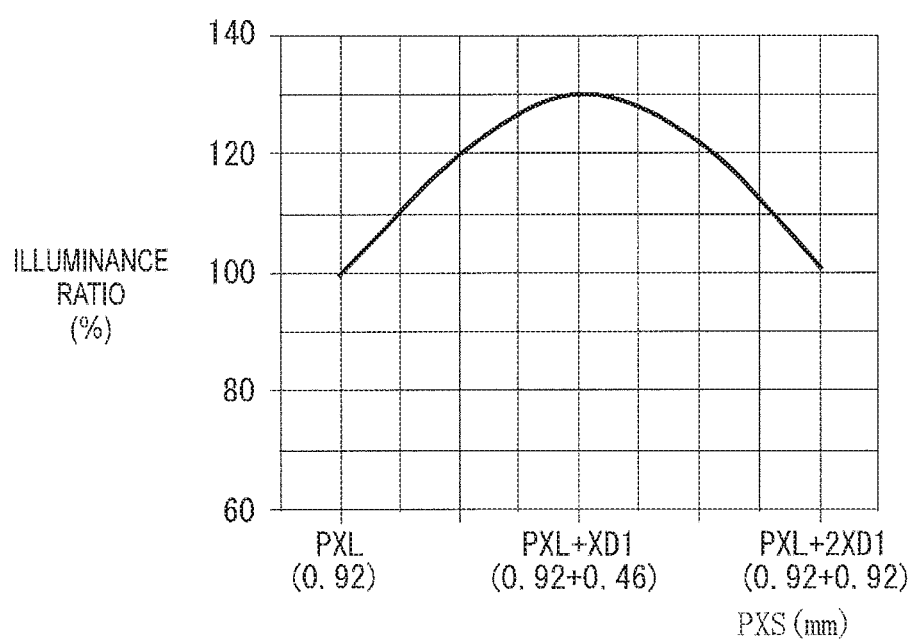
FIG. 21 is a graph showing a test result of an illuminance distribution test (3) performed by preparing LED heads employing the configuration of the second embodiment as test samples.

FIG. 21 is a graph showing a test result of an illuminance distribution test (3) performed by preparing LED heads employing the configuration of the second embodiment to satisfy the following conditions as test samples:

$PXL=0.92$ mm $0.92$ (mm)$<PXS<1.84$ (mm), and $M=3$.

In the illuminance distribution test (3), the illuminance obtained with each of the above-described LED heads was measured with the optical image measuring instrument shown in FIG. 13, in which the illuminance of the image at each position was measured in regard to each test sample while moving the photosensor 301 with reference to the central axis of a certain lens to the central axis of an adjacent lens similarly to the illuminance distribution test (1) described earlier. The measurement graph of FIG. 21 shows the average of the illuminance distributions measured at each position.

In FIG. 21, the interval PXS on the horizontal axis is represented by use of the interval PXL and the difference XD1 according to the aforementioned expression (6), and the vertical axis represents the measured illuminance as a ratio on the assumption that the illuminance when the interval PXL to the lens 18 and the interval PXS to the opening 22 are equal to each other as in the setting condition shown in FIG. 12, i.e., when PXL=PXS, is 100%.

As shown in the measurement graph of FIG. 21, the illuminance of the image hits the maximum when $PXS=PXL+XD1$ as the measurement condition in FIG. 19 is satisfied, that is, when the principal ray R1 emitted from an LED element 34 passes through the opening center 26 (FIG. 10) of a circular opening 22 of the light blocking plate 21, and becomes substantially equal to the illuminance in the aforementioned setting condition of FIG. 12 where the interval PXS equals the interval PXL when $PXS=PXL+2\times XD1$ as the measurement condition in FIG. 20 is satisfied.

Incidentally, while the optical axes 25 each being common to a pair of lenses 18 and 19, the opening centers 26 (FIG. 10) of the openings 22 of the light blocking plate 21 provided corresponding to the optical axes 25, and the opening centers 27 (FIG. 9) of the openings 24 of the mask 23 provided corresponding to the optical axes 25 are arranged to coincide with each other in the Y-axis direction positions as shown in FIG. 7 in the first and second embodiments, the arrangement of the optical axes 25, the opening centers 26 and the opening centers 27 is not limited to this example.

Specifically, let PYD represent the Y-axis direction distance between an optical axis 25 and the opening center 26 of an opening 22 of the light blocking plate 21 arranged corresponding to the optical axis 25 and the Y-axis direction distance between an optical axis 25 and the opening center 27 (FIG. 9) of an opening 24 of the mask 23 arranged corresponding to the optical axis 25, that is, the interval from an imaginary plane 40 passing through the optical axis 25 and orthogonal to the Y-axis direction to the opening center 26 of the opening 22 and the opening center 27 of the opening 24, the setting may be made to satisfy a relationship of $PYD<(PXS-PXL)$ (12).

It becomes possible to more efficiently block/transmit the light from the lenses in a more balanced manner as the interval PYD becomes close to zero; however, according to the result of the test carried out by the present inventors, excellent illuminance results were obtained by maintaining the relationship of the above expression (12).

As described above, according to the lens unit of the second embodiment, among the rays forming the image, rays having aberration can be blocked and the amount of light blockage can be held down, by which a clear and bright image can be obtained.

Third Embodiment

Figure 22:
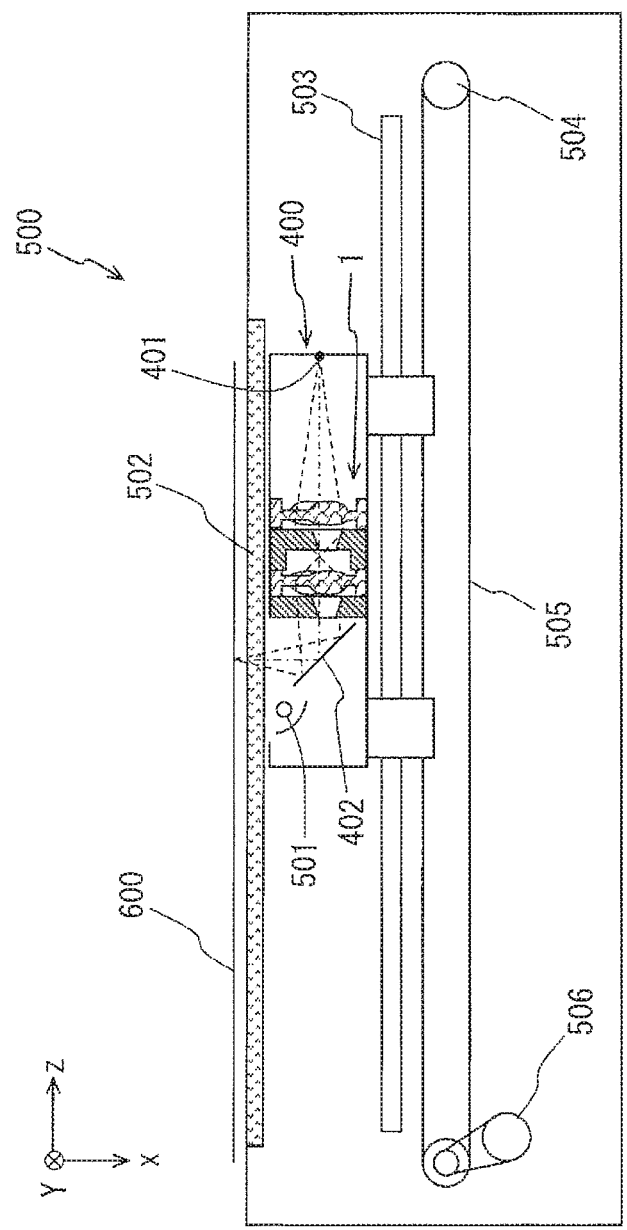
FIG. 22 is a principal part configuration diagram showing a principle part configuration of a scanner of a third embodiment of the present invention.

FIG. 22 is a principal part configuration diagram showing a principle part configuration of a scanner as a scanning device of a third embodiment of the present invention. The scanner 500 shown in the figure generates electronic data of a document 600.

In the scanner 500, a scanning head 400 arranged to be movable on a rail 503 takes in rays of light reflected on the surface of the document 600 placed on a document table 502 and transduces the rays into electronic data. The document table 502 is formed of a material that allows visible light to pass through, and a lamp 501 as an illumination device is arranged so that rays emitted from the illumination device are reflected on the surface of the document 600 and taken into the scanning head 400. A drive belt 505 stretched across a plurality of pulleys 504 and joined to the scanning head 400 at a predetermined position is driven by a motor 506 and moves the scanning head 400 along the rail 503.

A mirror 402 reflects the optical path of the rays reflected by the document 600 towards the lens unit 1, and the lens unit 1 forms an image of the document 600. A line sensor 401 as a transduction device is made up of a plurality of photoreceptor elements arranged substantially in a straight line and transduces the image of the document 600 into an electric signal. Incidentally, as for the X-axis, Y-axis and Z-axis directions in FIG. 22, the direction of the optical axis of the lens unit 1 is defined as the Z-axis direction, the width direction of the lens unit 1 is defined as the X-axis direction, and a direction orthogonal to both of these directions is defined as the Y-axis direction. The plurality of photoreceptor elements of the line sensor 401 are arranged in the Y-axis direction in this example.

FIG. 7 explained earlier corresponds to a cross-sectional view showing this lens unit 1 viewed from the −X-axis side in FIG. 22. In the third embodiment, the components are arranged so that the light-emitting surface 32a of the lens unit 1 corresponding to the object surface coincides with the document 600 and the drum surface 41a corresponding to the imaging surface coincides with the line sensor 401. The lens unit 1 itself in the third embodiment has the same configuration as the aforementioned lens unit 1 described in the first embodiment. In the third embodiment, the line sensor 401 has a resolution of 1200 dpi, in which the photoreceptor elements are arranged at a density of 1200 pieces per inch (1 inch equals approximately 25.4 mm), namely, at arrangement intervals of 0.02117 mm.

In regard to the configuration described above, the operation of the scanner 500 will be described below.

When the lamp 501 lights up, rays of light are reflected by the document 600 and taken into the scanning head 400. The scanning head 400 is moved together with the lamp 501 in parallel with the document 600 by the drive belt 505 driven by the motor 506 and takes in the rays reflected from the entire surface of the document. In this case, the rays reflected from the document 600 pass through the document table 502, undergo the optical path reflection by the mirror 402, and enter the lens unit 1 as shown in FIG. 22. The image of the document 600 is formed on the line sensor 401 by the lens unit 1, and the line sensor 401 transduces the image of the document 600 into the electric signal.

As described above, according to the scanner of the third embodiment, a clear and bright image can be obtained since the scanner employs the lens unit capable of blocking rays having aberration among the rays forming the image and holding down the amount of light blockage.

While examples of employing the present invention for an image forming apparatus as a color printer or a scanning device as a scanner have been described in the above embodiments, the present invention is not limited to such examples but can be employed also for other types of image forming apparatus such as copying machines, facsimile machines and MFPs. Further, while color printers have been described above, the present invention is employable also for monochrome printers.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. A lens unit comprising:
   a first lens array including a plurality of first lenses arranged in at least two parallel first lines extending in a first direction;
   a second lens array including a plurality of second lenses arranged in correspondence with the first lens array, the plurality of second lenses respectively facing the plurality of first lenses of the first lens array, the second lens array being arranged to face the first lens array so that each pair of the first and second lenses facing each other has a common optical axis;
   a first light blocking member arranged between the first lens array and the second lens array and having a plurality of first openings arranged in at least two parallel second lines extending in the first direction, the plurality of first openings each being arranged to face the pair of the first and second lenses in a direction of the optical axis; and
   a second light blocking member arranged to face the first light blocking member via the second lens array and having a plurality of second openings, each of the plurality of second openings being situated at a focal position of a corresponding second lens of the second lens array and being arranged to face a respective pair of the first and second lenses in the direction of the optical axis, wherein
   PXL is defined as a distance in a second direction orthogonal to the first direction and the direction of the optical axis, between a first passing line passing in the first direction through an array center position that is a center between two adjacent first lines of the at least two first lines and a second passing line passing in the first direction through the optical axis of any one of the first lenses,
   PXS is defined as a distance in the second direction between a third passing line passing in the direction of the optical axis, through the array center position and a fourth passing line passing in the direction of the optical axis, through an opening center of any one of the first openings, and
   the PXL and the PXS satisfy a relationship of $PXS \cdot (m-1)/m < PXL < PXS$ where m represents a ratio of a distance from a first principal surface of the second lens to an object surface to a focal length of the second lens.

2. The lens unit according to claim 1, wherein PXM is defined as a distance in the second direction between a fifth passing line passing in the first direction, through an array center position that is a center between two adjacent second lenses and a sixth passing line passing in the first direction, through an opening center of any one of the second openings, and satisfies a relationship of $PXM \leq PXS$.

3. The lens unit according to claim 1, wherein the PXL and the PXS satisfy a relationship of $PXL < PXS < PXL \cdot (m+1)/(m-1)$.

4. The lens unit according to claim 3, wherein PXM is defined as a distance in the second direction between a fifth passing line passing in the first direction through an array center position that is a center between two adjacent second lenses and a sixth passing line passing in the first direction, through an opening center of any one of the second openings, and is substantially equal to the PXL.

5. The lens unit according to claim 1, wherein the first opening has a substantially plane-symmetrical shape with respect to an imaginary plane passing through the opening center of each of the plurality of first openings and orthogonal to the second direction.

6. The lens unit according to claim 1, wherein the second opening has a substantially plane-symmetrical shape with respect to an imaginary plane passing through an opening center of each of the plurality of second openings and orthogonal to the second direction.

7. The lens unit according to claim 1, wherein PYD is defined as a distance in the second direction between the optical axis and the fourth passing line passing in the direction of the optical axis, through the opening center of any one the first openings facing the optical axis, and satisfies a relationship of $$PYD<(PXS-PXL).$$

8. An exposure device comprising:
a light-emitting unit; and
a lens unit that focuses a light beam emitted from the light-emitting unit to form an image at a predetermined position, wherein
the lens unit is the lens unit according to claim 1.

9. An LED head comprising:
an LED array; and
a lens unit that focuses a light beam emitted from the LED array to form an image at a predetermined position, wherein
the lens unit is the lens unit according to claim 1.

10. An image forming apparatus comprising:
an electrostatic latent image bearing body for bearing an electrostatic latent image; and
a lens unit that focuses a light beam emitted from a light-emitting unit to form an image on the electrostatic latent image bearing body, wherein
the lens unit is the lens unit according to claim 1.

11. A scanning device comprising:
a lens unit that focuses light reflected by a scanned document to form an image at a predetermined position; and
a transduction device that transduces the image into an electric signal, wherein
the lens unit is the lens unit according to claim 1.

\* \* \* \* \*